United States Patent
Cai et al.

(10) Patent No.: US 10,669,155 B2
(45) Date of Patent: Jun. 2, 2020

(54) METHOD FOR SYNTHESIZING GRAPHENE FROM ENCAPSULATED PARTICLES

(71) Applicant: United States of America as Represented by Secretary of Agriculture, Washington, DC (US)

(72) Inventors: Zhiyong Cai, Madison, WI (US); Qiangu Yan, Starkville, MS (US); Jilei Zhang, Starkville, MS (US); Jinghao Li, Madison, WI (US); Bruno Sisto Marcoccia, Charlotte, NC (US); James David Freiberg, Baraboo, WI (US)

( * ) Notice: Subject to any disclaimer, the term of this patent is extended or adjusted under 35 U.S.C. 154(b) by 399 days.

(21) Appl. No.: 15/862,039

(22) Filed: Jan. 4, 2018

(65) Prior Publication Data

US 2018/0194630 A1 Jul. 12, 2018

Related U.S. Application Data

(63) Continuation-in-part of application No. 15/400,281, filed on Jan. 6, 2017, now abandoned.
(Continued)

(51) Int. Cl.
| | |
|---|---|
| *C01B 32/184* | (2017.01) |
| *B01J 13/06* | (2006.01) |
| *C01B 32/194* | (2017.01) |
| *B01J 13/02* | (2006.01) |
| *B82Y 40/00* | (2011.01) |

(Continued)

(52) U.S. Cl.
CPC ............. *C01B 32/184* (2017.08); *B01J 13/02* (2013.01); *B01J 13/06* (2013.01); *C01B 32/194* (2017.08); *B01J 23/70* (2013.01); *B82Y 30/00* (2013.01); *B82Y 40/00* (2013.01); *Y02P 20/145* (2015.11);
(Continued)

(58) Field of Classification Search
CPC . C01B 32/184; C01B 32/194; C01B 2204/02; C01B 2204/04; C01B 2204/06; C01B 2204/20; C01B 2204/22; C01B 2204/24; C01B 2204/28; C01B 2204/30; C01B 2204/32; C01B 32/21; C01B 32/215; C01B 32/22; C01B 32/225; C01B 32/23; C01B 32/182; C01B 32/198; B01J 13/02; B01J 13/06; B01J 23/70; Y02P 20/145; Y10S 977/842; Y10S 977/734; B82Y 40/00; B82Y 30/00
See application file for complete search history.

(56) References Cited

U.S. PATENT DOCUMENTS

| | | | |
|---|---|---|---|
| 9,278,162 B2 | 3/2016 | Jeong | |
| 9,340,427 B2 | 5/2016 | Kim | |

(Continued)

FOREIGN PATENT DOCUMENTS

WO    WO 2011/162727    * 12/2011    ............. C01B 31/04

OTHER PUBLICATIONS

Yan, et al., Mass production of graphene materials from solid carbon sources using a molecular cracking and welding method, J. Mater. Chem. A 2019; 7: 13978-13985 (Year: 2019).*

*Primary Examiner* — Daniel C. McCracken

(57) ABSTRACT

A method of synthesizing a graphene-based material comprises exposing graphene-encapsulated metal nanoparticles, each nanoparticle comprising a graphene shell surrounding a metal core, to a cracking and welding gas composition under conditions sufficient to crack graphene shells and to reconstruct cracked graphene shells to form the graphene-based material.

20 Claims, 28 Drawing Sheets

Related U.S. Application Data

(60) Provisional application No. 62/443,207, filed on Jan. 6, 2017.

(51) Int. Cl.
 *B82Y 30/00* (2011.01)
 *B01J 23/70* (2006.01)
(52) U.S. Cl.
 CPC ........ *Y10S 977/734* (2013.01); *Y10S 977/842* (2013.01)

(56) References Cited

U.S. PATENT DOCUMENTS

| | | | |
|---|---|---|---|
| 2007/0218283 A1* | 9/2007 | Geng | B22F 1/0018 428/403 |
| 2009/0068470 A1* | 3/2009 | Choi | B82Y 30/00 428/403 |
| 2012/0308468 A1* | 12/2012 | Choi | B82Y 30/00 423/415.1 |
| 2013/0189444 A1 | 7/2013 | Kub | |
| 2013/0214252 A1 | 8/2013 | Park | |
| 2014/0120030 A1 | 5/2014 | Kim | |

\* cited by examiner

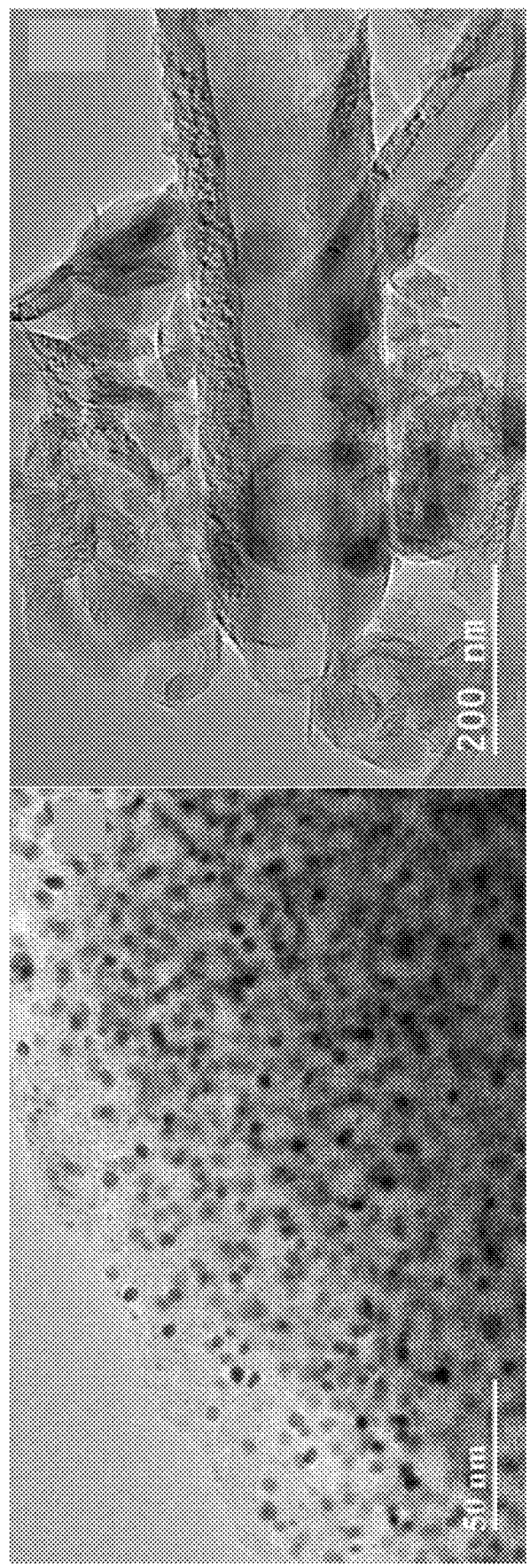

METHOD FOR SYNTHESIZING GRAPHENE FROM ENCAPSULATED PARTICLES

CROSS-REFERENCE TO RELATED APPLICATIONS

The present application claims priority to U.S. Provisional Patent Application No. 62/443,207 that was filed Jan. 6, 2017. The present application is also a continuation-in-part of, and claims priority to, U.S. patent application Ser. No. 15/400,281 that was filed Jan. 6, 2017.

REFERENCE TO GOVERNMENT RIGHTS

This invention was made with government support under grant numbers 11-JV-11111124-097, 12-JV-11111124-091, 15-JV-1111124-016 awarded by the USDA Forest Service. The government has certain rights in the invention.

BACKGROUND

Mechanical cleaving (exfoliation), chemical exfoliation, chemical synthesis, and thermal chemical vapor deposition (CVD) synthesis are commonly used methods for graphene synthesis. Currently, the most successful route to synthesizing graphene is chemical vapor deposition (CVD). Thermal CVD is typically applied to graphene formation over transition metals, including copper, nickel, iridium, and ruthenium. Thermal CVD techniques can also be used for graphene synthesis over dielectrics, and various other oxides. The CVD graphene process is limited to the use of gaseous raw materials, making it difficult to apply the technology to a wider variety of potential carbon precursors, especially solid carbon resources.

The challenges of sustainable development have driven people to find facile, environmental friendly ways to produce carbon-based nanomaterials. Biomass presents an abundant and low-cost source of carbon. However, there have been limited studies on the use of wood or agricultural biomass as the carbon source for the production of graphene-based materials.

SUMMARY

Provided are methods for synthesizing graphene-based materials, e.g., graphene sheets, from a variety of carbon sources, e.g., biomass.

This summary describes several embodiments of the presently-disclosed subject matter. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

In one embodiment, a method of synthesizing a graphene-based material comprises exposing graphene-encapsulated metal nanoparticles, each nanoparticle comprising a graphene shell surrounding a metal core, to a cracking and welding gas composition under conditions sufficient to crack graphene shells and to reconstruct cracked graphene shells to form the graphene-based material.

In another embodiment, a method of synthesizing a graphene-based material comprises: mixing a first solution comprising a first solvent and a carbon source with a second solution comprising a second solvent and a metal source to form a carbon-metal mixture; exposing the carbon-metal mixture to an inert gas composition at an elevated temperature and for a period of time sufficient to at least partially decompose the carbon source, followed by ground-milling, thereby forming a carbon-metal precursor; exposing the carbon-metal based precursor to another inert gas composition at another elevated temperature for another period of time sufficient to convert the carbon to graphene, thereby forming graphene-encapsulated metal nanoparticles, each nanoparticle comprising a graphene shell surrounding a metal core; and exposing the graphene-encapsulated metal nanoparticles to a cracking and welding gas composition under conditions sufficient to crack graphene shells and to reconstruct cracked graphene shells to form the graphene-based material.

Other principal features and advantages of the invention will become apparent to those skilled in the art upon review of the following drawings, the detailed description, and the appended claims.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

FIG. 10A is an SEM image and FIG. 10C is an TEM image of graphene-encapsulated nickel nanoparticles from Ni-lignin prior to exposure to the cracking and welding gas composition Ar/CH$_4$. FIG. 10B is an SEM image and FIG. 10D is an TEM image of graphene-encapsulated nickel nanoparticles from Ni-lignin after exposure to the cracking and welding gas composition Ar/CH$_4$.

DEFINITIONS

Figure 1A:
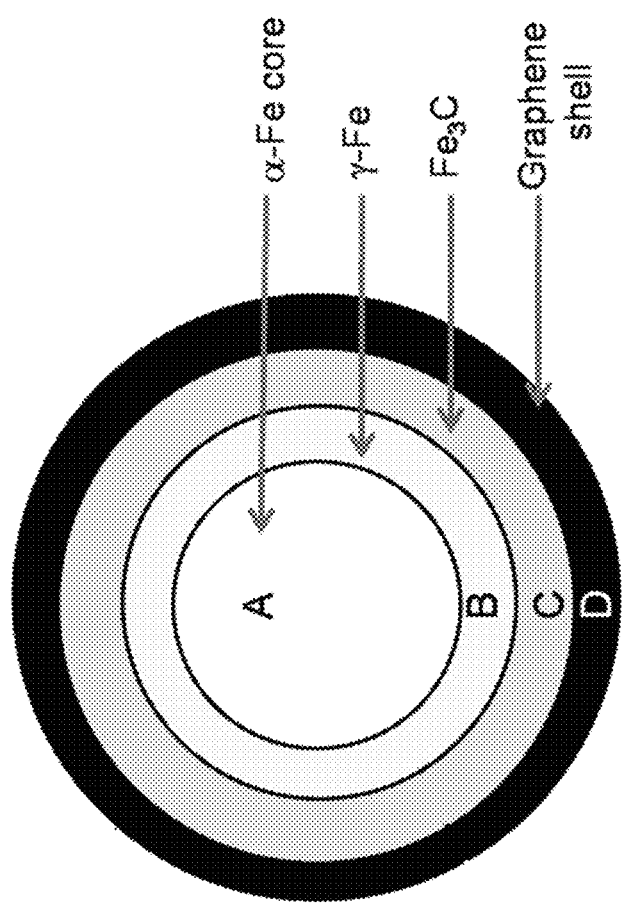
FIG. 1A depicts a graphene-encapsulated iron nanoparticle according to an illustrative embodiment.

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials are described below.

Following long-standing patent law convention, the terms "a", "an", and "the" refer to "one or more" when used in this application, including the claims. Thus, for example, reference to "a lignin source" includes a plurality of lignin sources, and so forth.

The terms "comprising", "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Unless otherwise stated, as used herein, "lignin" refers to lignin and sources thereof. Therefore, the term "lignin" includes, but is not limited to, kraft lignin (or thiolignin) and lignosulfonate (LS) from the pulping process, milled wood lignin (MWL), sulfur-free lignins from biomass conversion technologies, organosolv pulping (organosolv lignin), and soda pulping processes (alkali lignin or soda lignin), hydrolytic lignin, Klason lignin, and other lignin productions and derivatives from unusual plant sources or experimental pulping processes as known in the art. Additionally, regardless of whether it is expressly stated, "lignin" as used herein can include lignin as well as one or more sources of lignin.

All combinations of method or process steps as used herein can be performed in any order, unless otherwise specified or clearly implied to the contrary by the context in which the referenced combination is made.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

In one aspect, a method of synthesizing a graphene-based material is provided. An embodiment of such a method comprises exposing graphene-encapsulated metal nanoparticles, each nanoparticle comprising a graphene shell surrounding a metal core, to a cracking and welding gas composition under conditions sufficient to crack graphene shells and to reconstruct cracked graphene shells to form the graphene-based material.

The size and shape of the graphene-encapsulated metal nanoparticles is not particularly limited. However, as illustrated in the Examples below (e.g., Example A), the graphene-encapsulated metal nanoparticles may be spherical or ovoid-shaped and may have a diameter of less than about 20 nm. The metal of the graphene-encapsulated metal nanoparticles may be a transition metal, including, but not limited to, iron (Fe); copper (Cu); nickel (Ni); cobalt (Co); molybdenum (Mo); tungsten (W); or combinations thereof. The transition metal(s) may be in their elemental form or in compound form, e.g., a metal carbide such as $Fe_3C$ or $Mo_2C$. In this disclosure, the term "graphene" encompasses both a single layer and multiple layers of graphene. In embodiments, the graphene shell of the graphene-encapsulated metal nanoparticles comprises multiple layers of graphene. The average inter-planar distance between the multiple layers of graphene may be about 0.335 nm. The graphene-encapsulated metal nanoparticles may be provided as a dispersion of the nanoparticles in a carbon matrix, including an amorphous carbon matrix. (See, e.g., FIG. 5A.)

A schematic of an individual graphene-encapsulated iron nanoparticle is shown in FIG. 1A. The core is composed of various forms of iron, including $Fe_3C$ (C), γ-Fe (B), and α-Fe (A). The composition of the core may be determined using X-ray diffraction techniques, e.g., see FIG. 3. The graphene shell (D) surrounds the metal core. As described above, the graphene shell (D) may comprise multiple layers of graphene.

Formation of the graphene-encapsulated metal nanoparticles may be accomplished via any suitable method for surrounding metal nanoparticles with one or more layers of graphene. Suitable methods include, but are not limited to, high-temperature annealing (HTA), arc discharge or modified arc discharge, chemical vapor deposition (CVD), electron beam irradiation, pyrolysis of organometallic compounds, microwave arcing, hydrothermal carbonization (HTC), explosion or detonation, or a combination thereof.

However, in embodiments, the graphene-encapsulated metal nanoparticles are formed from carbon-metal based precursors. The carbon-metal based precursors may comprise a carbon matrix, e.g., amorphous carbon. The carbon metal based precursors may comprise carbon-encapsulated metal nanoparticles dispersed in a carbon matrix.

Carbon-Metal Based Precursors

Carbon-metal based precursors may be formed by mixing, e.g., uniformly mixing, a carbon source and a metal source to form a carbon-metal mixture. Either or both of the carbon source and the metal source may be dissolved in separate solvents prior to mixing. If a solvent is used for both the carbon source and the metal source, they may be different solvents. The solvent(s) may be selected on the basis of its ability to dissolve, or to provide a homogenous dispersion of, the selected carbon and metal sources. In addition, the solvent(s) may be selected to maximize the yield and quality of the graphene-based material. In embodiments, the solvent for the carbon source is selected from organic solvents. Illustrative organic solvents are provided in the Examples, below. In embodiments, the solvent for the carbon source is tetrahydrofuran, a solvent which the inventors have found to significantly improve the yield and quality of the graphene-based material, including from a biomass source, e.g., kraft lignin.

Various amounts of the carbon source and the metal source may be used in the mixture, although the amount is generally selected to maximize the yield and quality of the graphene-based material. In embodiments, the amount of the metal source is in the range of from 2.5% to 30% by weight. However, in embodiments, the amount of the metal source is in the range of from 5% to 15% by weight, which the inventors have found to significantly improve the yield and quality of the graphene based material, including from a biomass source, e.g., kraft lignin. In embodiments, the amount of the carbon source is in the range of from 70% to 97.5% by weight. In embodiments, the mass ratio of carbon source to metal source include, but are not limited to those in the range of from 30:1 to 1:30, 1:1 to 1:30, 20:1 to 1:1, 1:1 to 1:20, 10:1 to 1:1, and 1:1: to 1:10. Specific illustrative amounts and ratios of the carbon source and the metal source are provided in the Examples, below.

The carbon source may be a biomass feedstock, such as, but not limited to, wood chips; wood char; starch; wood-derived sugars (e.g., glucose, xylose, arabinose, galactose, mannose, cellulose, hemicellulose); mixture sugars from biomass hydrolysis process; lignin (kraft lignin, organosolv lignin, lignosulfonates, hydrolytic lignin, black liquor, lignin from kraft pulp mills); cellulose; cellulose nanofibril; bamboo; rattan; or combinations thereof. Other suitable carbon sources include, but are not limited to, active carbon, carbon black, pitch; tar or a combination thereof. In embodiments, the biomass feedstock is kraft lignin.

The metal source may be an elemental metal source (e.g., iron powder) or a metal compound such as a metal salt or metal oxide. Metal compounds may be based on a single metal or be bimetallic or trimetallic. In embodiments, the metal of the metal source is a transition metal. Transitional metals are classified into three groups according to their reactivity with carbon: (i) metals in groups IB and IIB; (ii) metals in group VIII; and (iii) metals in groups IVB and VIIB. The metals in groups IB and IIB cannot react with carbon because of a completed d-electron shell. The metals in group VIII have a d shell occupied by 6 to 10 electrons and can dissolve carbon, although the energy level of such configurations is scarcely changed by accepting additional electrons from carbon (usually carbon is thought to dissolve as the positively charged ion). The metals in groups IVB and VIIB have 2 to 5 electrons in the d shell and form strong chemical bonds with carbon and yield the metal carbide. Accordingly, as noted above, in embodiments, the metal source comprises at least one of Fe, Cu, Ni, Co, Mo, and W. The particular choice of metal may be determined by the desired morphology for the graphene-based material, as further described below. In addition, Fe is desirable because it is a relatively low-cost material.

When the metal source is provided as a metal salt, a variety of anions may be used, e.g., nitrates, sulfonates, chlorides, sulfides. However, the type of metal salt may be selected to maximize the yield and quality of the graphene-based material. In embodiments, the metal salt is a metal nitrate, which the inventors have found provides carbon-metal precursors with a homogenous distribution of carbon and metal and significantly improves the yield and quality of the graphene-based material, including from a biomass source, e.g., kraft lignin.

In embodiments, the carbon-metal based precursor is formed hydrothermally through the reduction of the metal source in a solution. For example, in embodiments, carbon-encapsulated iron nanoparticles are synthesized hydrothermally by the reduction of $Fe^{2+}$ (from iron (III) nitrate nonahydrate as the metal source) in a cellulose nanofibril solution.

Illustrative mixing conditions for forming the carbon-metal mixture are described in the Examples, below. The mixture may be subjected to additional steps. First, the mixture may be dried, e.g., by heating at a temperature in the range of from 80 to 150° C., for a period of time in the range of from 12 to 24 hours.

Second, the mixture may subjected to a predecomposition step, which the inventors have found to be important to minimize or prevent potential explosions during the formation of the graphene-based material as further described below. This predecomposition step may comprise exposing the carbon-metal mixture, e.g., the dried carbon-metal mixture, to an inert gas composition (e.g., Ar, $N_2$, or both) under conditions sufficient to at least partially decompose the carbon source (e.g., a biomass source such as kraft lignin). Such conditions may refer to the temperature and time, which may vary depending upon the selected carbon source. By way of illustration, the thermal degradation temperature of kraft lignin begins at 200° C., which corresponds to β-O-4 bond breaking. Thus, in embodiments, the temperature is in the range of from 200 to 300° C., from 250 to 300° C., or 300° C. The predecomposition step and additional illustrative conditions are further described in Example B (Examples 36B-40B), below.

Finally, after predecomposition, the product may be ground-milled to a desired size. Without wishing to be bound by theory, it is thought that cleavage of aryl-ether linkages results in the formation of highly reactive radicals that may further interact and form a highly condensed crosslinking structure which sticks to metal. As long as the metal is trapped in the condensed carbon, metal particles are prevented from contacting carbonaceous gases in the formation of the graphene-based materials. This can stop graphene growth, which suppresses yield and selectivity.

Figure 14:
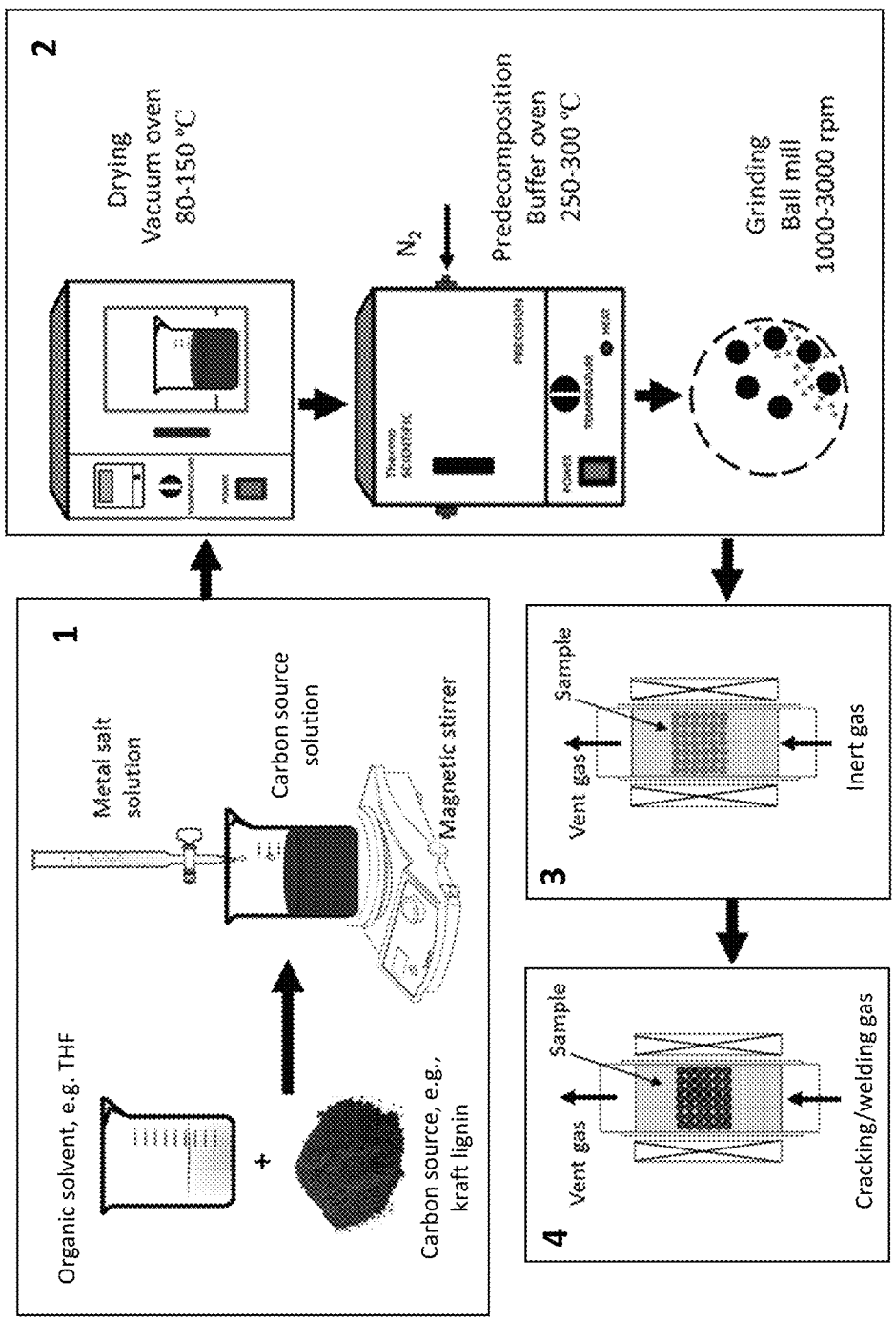
FIG. 14 shows a schematic illustrating the formation of carbon-metal based precursors (panels 1 and 2), formation of graphene-encapsulated metal nanoparticles (panel 3) and formation of graphene-based materials (panel 4) according to an illustrative embodiment.

The formation of the carbon-metal based precursors, including formation of the carbon-metal mixture, the drying step, the predecomposition step and ground-milling may be carried out in open, bench-top systems as illustrated in the first two panels of FIG. 14. Panel 1 illustrates the formation of the carbon-metal mixture and panel 2 illustrates the drying, predecompostion and ground-milling steps.

Graphene-Encapsulated Metal Nanoparticles

As described above, the graphene-encapsulated metal nanoparticles may be derived from a variety of techniques. However, in embodiments, the graphene-encapsulated metal nanoparticles may be formed by thermally treating the carbon-metal based precursors described above. In embodiments, the carbon-metal based precursor is exposed to an inert gas composition at an elevated temperature (e.g., in the range of from 700 and 1000° C.) for a period of time (e.g., 1 hour). In this disclosure, the term "elevated" means greater than room temperature. A variety of inert gases and combinations of gases may be used (e.g., Ar, $N_2$). As illustrated in the Examples below, the conditions of the thermal treatment such as the temperature, time may be selected so as to convert the carbon in the carbon-metal based precursor to graphene. The flow rate (e.g., 50-200 mL/min) of the inert gas composition may be similarly selected. The final product may be actively or naturally cooled to ambient temperature. The inert gas composition may be introduced prior to loading the carbon-metal based precursor. The graphene-encapsulated metal nanoparticles in the carbon matrix may be ground-milled to a desired size prior to further processing with the cracking and welding gas composition.

Figure 1B:
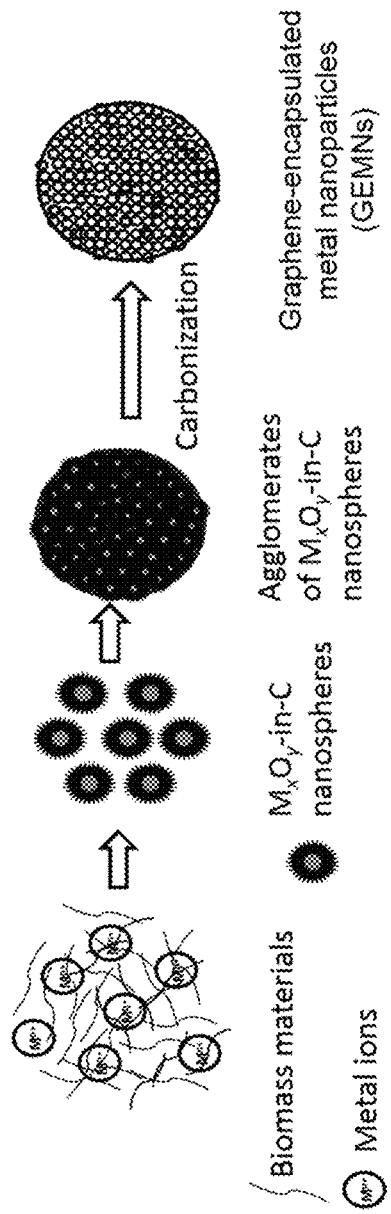
FIG. 1B depicts the formation of graphene-encapsulated metal nanoparticles according to an illustrative embodiment.

A schematic of the formation of graphene-encapsulated metal nanoparticles from biomass is illustrated in FIG. 1B. In the first step, the biomass (carbon source) is mixed with a metal source (e.g., a metal salt solution) comprising metal ions to form carbon-encapsulated metal oxide nanoparticles which aggregate to form larger agglomerates. This illustrative embodiment demonstrates that the metal in the carbon-metal based precursor may form metal-oxygen bonds. The agglomerates are thermally treated under conditions sufficient to carbonize the carbon-encapsulated metal oxide nanoparticles to form graphene-encapsulated metal nanoparticles.

Graphene-Based Material

As noted above, the graphene-based materials are formed by exposing graphene-encapsulated metal nanoparticles to the cracking and welding gas composition under conditions sufficient to crack graphene shells and to reconstruct cracked graphene shells to form the graphene-based material. This process may be referred to as catalytic thermal molecular scissoring and welding (CTMSW) since it involves cracking the graphene shell surrounding the metal core (akin to "scissoring") as well as reformation of carbon-carbon graphitic bonds and thus, reconstruction of graphene in various morphologies (akin to "welding").

Figure 2A:
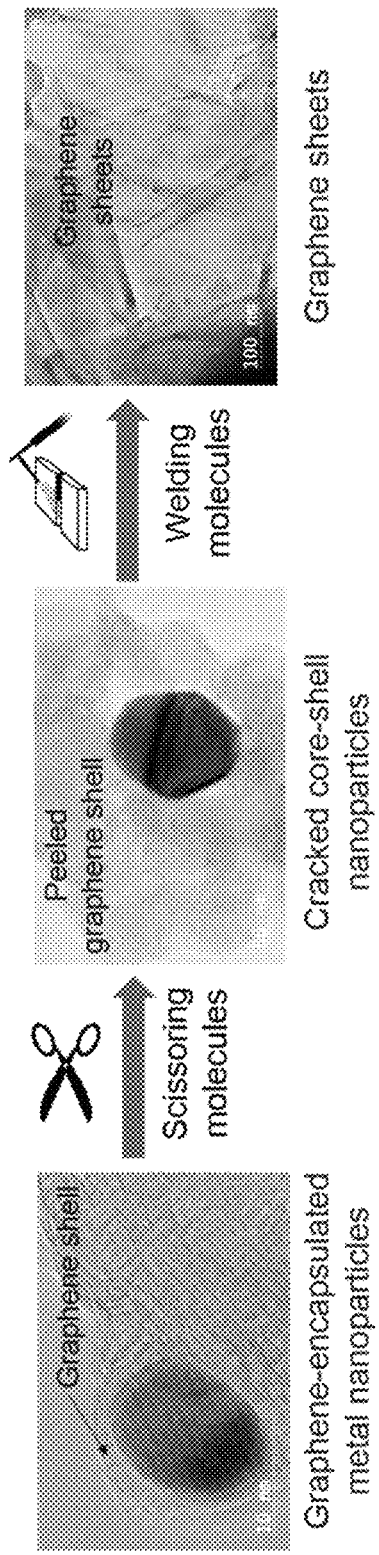
FIG. 2A depicts the formation of a graphene-based material from graphene-encapsulated metal nanoparticles according to an illustrative embodiment.

The CTMSW process is schematically illustrated in FIG. 2A. The schematic of FIG. 2A is not intended to suggest that scissoring and welding are sequential; they may happen simultaneously. Moreover, without wishing to be bound by theory, it is thought that the gases used during the process serve one or more of at least four different functions during the process: "gluing" multi-layer graphene shell structures together; reacting (gasifying) amorphous carbon precursors to carbonaceous gases followed by re-deposition to form graphene; healing defects formed in the graphene layers; and serving as a reactant to form carbon nanostructures (e.g., carbon nanotubes, graphene). Finally, as further described below, in addition to the flat graphene sheets shown in FIG. 2A, other morphologies may be formed, e.g., depending upon the type of graphene-encapsulated metal nanoparticles (e.g., the type of metal) and conditions used. By way of illustration, regarding the type of metal, the inventors have found that Fe provides graphene-based material in which the number of layers in the graphene can be controlled over a wide range, e.g., from a single layer to 30 layers. By contrast, Cu provides graphene-based material in which the number of layers in the graphene is typically in the range of from a single layer to 3 layers.

The cracking and welding gas composition may be selected depending upon the selected graphene-encapsulated metal nanoparticle and upon the desired morphology and yield of the graphene-based material. In embodiments, the cracking and welding gas composition comprises one or more of a light hydrocarbon (e.g., methane ($CH_4$), ethane ($C_2H_6$), propane ($C_3H_8$), natural gas (NG)). In embodiments, the cracking and welding gas may be selected from carbon dioxide ($CO_2$), carbon monoxide (CO), steam ($H_2O$), oxygen ($O_2$), air, argon (Ar), and hydrogen ($H_2$). Other carbonaceous gases may be used. Combinations of different gases may be used. The inventors have found that the chemical makeup of the cracking and welding gas composition significantly affects the yield and quality of the graphene-based materials, including by affecting the mechanism by which the graphene shell is separated from its metal core. As described immediately below, these findings are illustrated with reference to the graphene-encapsulated iron nanoparticle of FIG. 1A and include a description of three different mechanisms to separate the graphene shell from its metal core: (i) attack of the graphene shell, (ii) attack of an interface layer between the graphene shell and an inner core and (iii) attack of the entire metal core. The effects of cracking and welding gas composition are also evaluated in Example B.

Regarding the graphene-encapsulated iron nanoparticle of FIG. 1A and the different graphene shell separation mechanisms, the graphene ($C_g$) outer shell of the graphene-encapsulated iron nanoparticle may be cracked by reactive molecules such as $H_2$, $CO_2$ and $H_2O$ through the following reactions at high temperature:

$$C_g + 2H_2 \rightarrow CH_4$$

$$C_g + H_2O \rightarrow CO + H_2$$

$$C_g + CO_2 \rightarrow 2CO$$

However, the graphene shell will also be etched by hydrogen, steam, and carbon dioxide at high temperature in this process which greatly decreases the quality and the yield of the graphene-based products.

Alternatively, the $Fe_3C$ interface layer and the γ-iron sub-layer may be decarburized. Under certain temperature and cracking/welding gas partial pressure, gas molecules may permeate through the graphene shell and react with iron carbide ($Fe_3C$) and γ-iron. Specifically, under hydrogen atmosphere, hydrogen atoms diffuse into and react with cementite and carbon in γ-iron through the following reactions:

$$Fe_3C + 2H_2 \rightarrow 3Fe + CH_4$$

$$C_{(\gamma\text{-}iron)} + 2H_2 \rightarrow CH_4$$

The activity of carbon in $Fe_3C$ is much higher than that in iron phases. Thus, hydrogen will react more rapidly with carbon in $Fe_3C$ than with the carbon dissolved in γ-Fe. Therefore, the decarburization rate will be greater for cementite as compared to α-Fe and γ-Fe. Thus, $Fe_3C$ in the interface will be first and quickly decarburized by hydrogen to iron phase and the carbon released as methane ($CH_4$).

Under $CO_2$ atmosphere, cementite and carbon in γ-iron as well as Fe are oxidized to $Fe_3O_4$, and CO:

$$CO_2 + Fe_3C \rightarrow Fe_3O_4 + CO$$

$$CO_2 + Fe \rightarrow Fe_3O_4 + CO$$

$$C_{(\gamma\text{-}iron)} + CO_2 \rightarrow 2CO$$

$CO_2$ is a strong oxidant at high temperature, graphene-encapsulated iron nanostructures will be destroyed. Therefore, $CO_2$ is generally not a suitable cracking and welding gas.

There are a few reactions occurring under methane atmosphere: $CH_4$ is catalytically decomposed to graphene and $H_2$ over an iron particle surface, methane can also react with iron to form $Fe_3C$, and part of carbon atoms from methane will diffuse into γ and α iron phases:

$$CH_4 \rightarrow C_{(graphene)} + 2H_2$$

$$3Fe_{(\gamma\text{-}iron)} + CH_4 \rightarrow Fe_3C + 2H_2$$

$$CH_4 \rightarrow C_{(\gamma\text{-}iron)} + 2H_2$$

$$CH_4 \rightarrow C_{(\alpha\text{-}iron)} + 2H_2$$

With more carbon deposited between the graphene shell and iron core, the iron core will expand in volume, facilitating the cracking of the graphene shell.

Thus, for graphene-encapsulated iron particles, hydrogen, carbon dioxide and steam are more destructive and have strong etching effects on graphene structures. However, methane may crack the graphene shell without significant etching. Similarly, natural gas (NG) is a suitable cracking/welding gas as NG is composed of ~95% methane by volume.

Thus, the inventors have found that the cracking/welding gas composition may be selected to most effectively "peel" off the graphene shell from the metal core, which then may serve as a "building block" to provide various graphene morphologies via the "welding" processes described above. It is noted that cracking/welding gases which are less suitable for graphene-encapsulated iron nanoparticles may be acceptable for other types of graphene-encapsulated metal nanoparticles.

In addition to the type of cracking and welding gas composition, the conditions under which the graphene-encapsulated metal nanoparticles are exposed to the gas composition include the flow rate of the gas(es), the temperature, the heating rate to achieve the selected temperature, the heating time and the particle size (i.e., the particle size of the graphene-encapsulated metal nanoparticles in the carbon matrix). These parameters may be selected to achieve a desired morphology and yield of the graphene-based material. The selection of these parameters may depend upon the type of graphene-encapsulated metal nanoparticle (e.g., the type of metal) used. Illustrative flow rates include, but are not limited to, in the range of from 20 and 300 mL/min. Illustrative temperatures include, but are not limited to, at least 500° C., at least 600° C., at least 1000° C., in the range of from 500° C. and 1,500° C., in the range of from 600° C. and 1,500° C., in the range of from 800° C. and 1,500° C., or in the range of from 800° C. and 1,100° C. Illustrative heating rates include, but are not limited to, 2.5 to 30° C./min, including 2.5° C., 5.0° C., 10° C., 20° C., and 30° C./min. Illustrative heating times include, but are not limited to, at least 0.5 hours, up to 5 hours, up to 4 hours, in the range of from 0.5 hours and 5 hours, in the range of from 0.5 hours and 4 hours, in the range of from 0.5 hours and 3 hours, about 2 hours, and about 1 hour. Heating temperature and heating time are related, i.e., higher heating temperatures require less heating time. In embodiments, the heating temperature is at least 1000° C. and the heating time is at least 30 minutes. Other illustrative values of these parameters are described in the Examples, below.

The graphene-based material formed via the present methods comprises graphene (single layer and/or multilayer graphene). The graphene may adopt a variety of morphologies including, but not limited to, flat graphene sheets, curved graphene sheets, graphene chains, graphene sponges, fluffy graphene, graphene strips with a common metal joint, and graphene nanoplatelets. The graphene-based material further comprises metal, i.e., from the metal cores. As further described below, this metal may be subsequently removed.

Figure 2B:
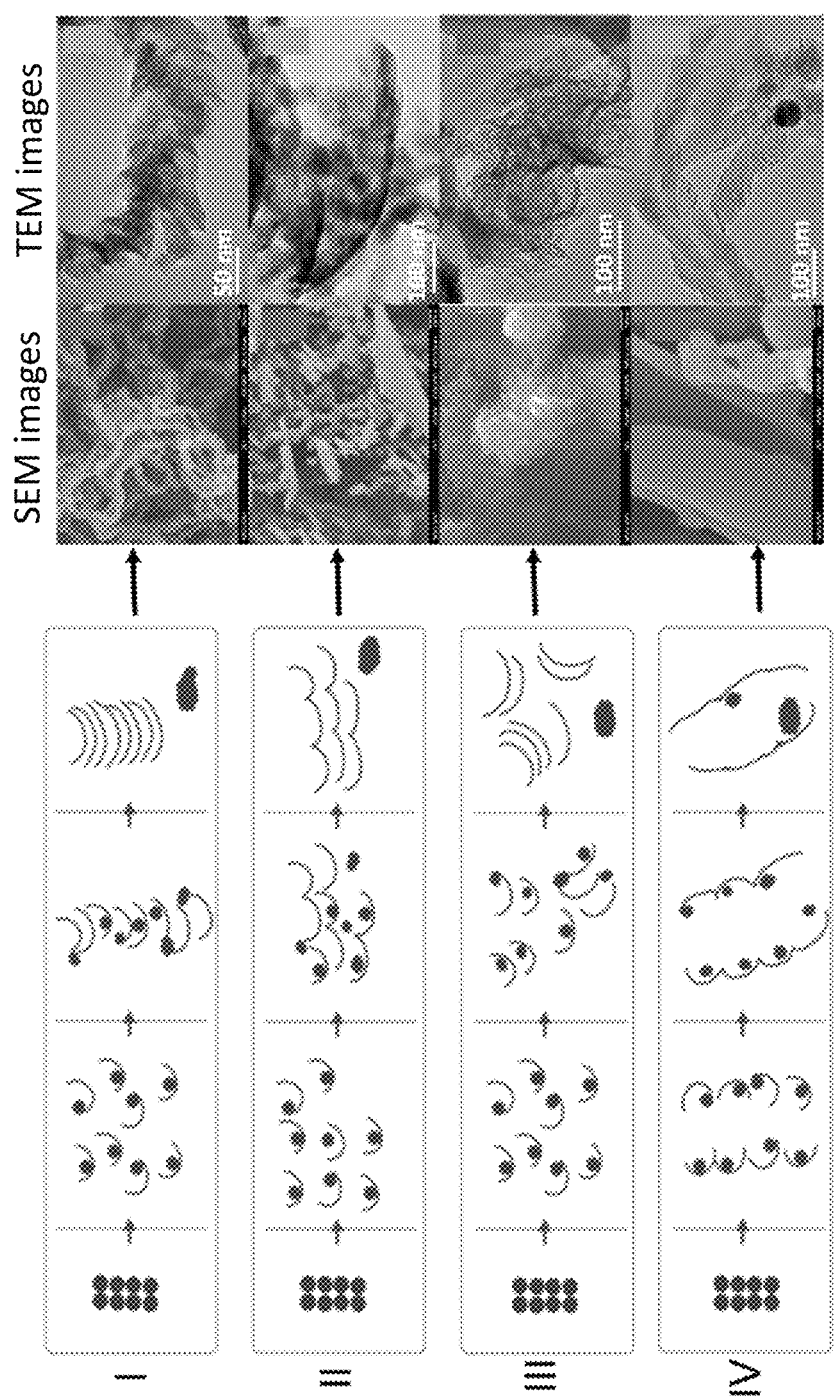
FIG. 2B depicts the formation of graphene-based materials from graphene-encapsulated metal nanoparticles according to an illustrative embodiment. The graphene in the material adopts different morphologies.

FIG. 2B illustrates some of the different graphene morphologies which may be formed. In the schematic panels, the filled circles represent metal cores and the thin curves represent graphene shells. The schematic panels further illustrate the CTMSW described above, involving cracking the graphene shells and reconstruction of graphene shells to form different graphene morphologies. The SEM and TEM images on the right correspond to graphene-based materials formed using the present methods. The top row (I) illustrates the formation of graphene chains. The next row down (II) illustrates the formation of graphene nanoplatelets. The next row down (III) illustrates the formation of fluffy graphene. The last row (IV) illustrates the formation of curved graphene sheets.

Formation of graphene chains (I) generally involves connecting hundreds of graphene shell building blocks along the perpendicular direction. Each graphene shell building block may be composed of from 1 to 30 layers of graphene and may be an average thickness of 10 nm or less. In-plane dimensions of each graphene shell building block may be from several nm to 20 nm. The length of the graphene chains may vary from hundreds of nanometers to over 10 μm. Formation of graphene, nanoplatelets (II) generally involves bonding along the horizontal direction of graphene shell building blocks. Otherwise the dimensions of the graphene shell building blocks may be as described above with respect to the graphene chains (I). Formation of fluffy graphene (III) generally involves random bonding along various directions. Otherwise the dimensions of the graphene shell building blocks may be as described above with respect to the graphene chains (I). Formation of curved graphene sheets generally involves reconstruction in both the horizontal and the perpendicular directions. Otherwise the dimensions of the graphene shell building blocks may be as described above with respect to the graphene chains (I).

The present methods may be characterized by the yield of graphene. The selectivity of solid residue product was calculated by X %=(A B)×100%, where A was the weight of the solid residue after catalytic thermal treatment, and B was the weight of metal-promoted kraft lignin sample before thermal treatment. The graphene selectivity was measured by TGA. 20 mg of the solid residue after catalytic thermal treatment was put on a ceramic sample pan for TPO analysis in Shimadzu TGA-50H instrument. By heating the sample in high flow of air (100 ml/min) from room temperature to 800° C. at 10° C./min, the weight change was recorded as related to carbon burning. The yield of graphene product was calculated by Y %=X % (C/D), where C was the weight loss of the solid residue after TGA, and D was the weight of solid residue sample before TGA. In embodiments, the yield is at least 90%, at least 95%, or at least 98%.

Figure 15:
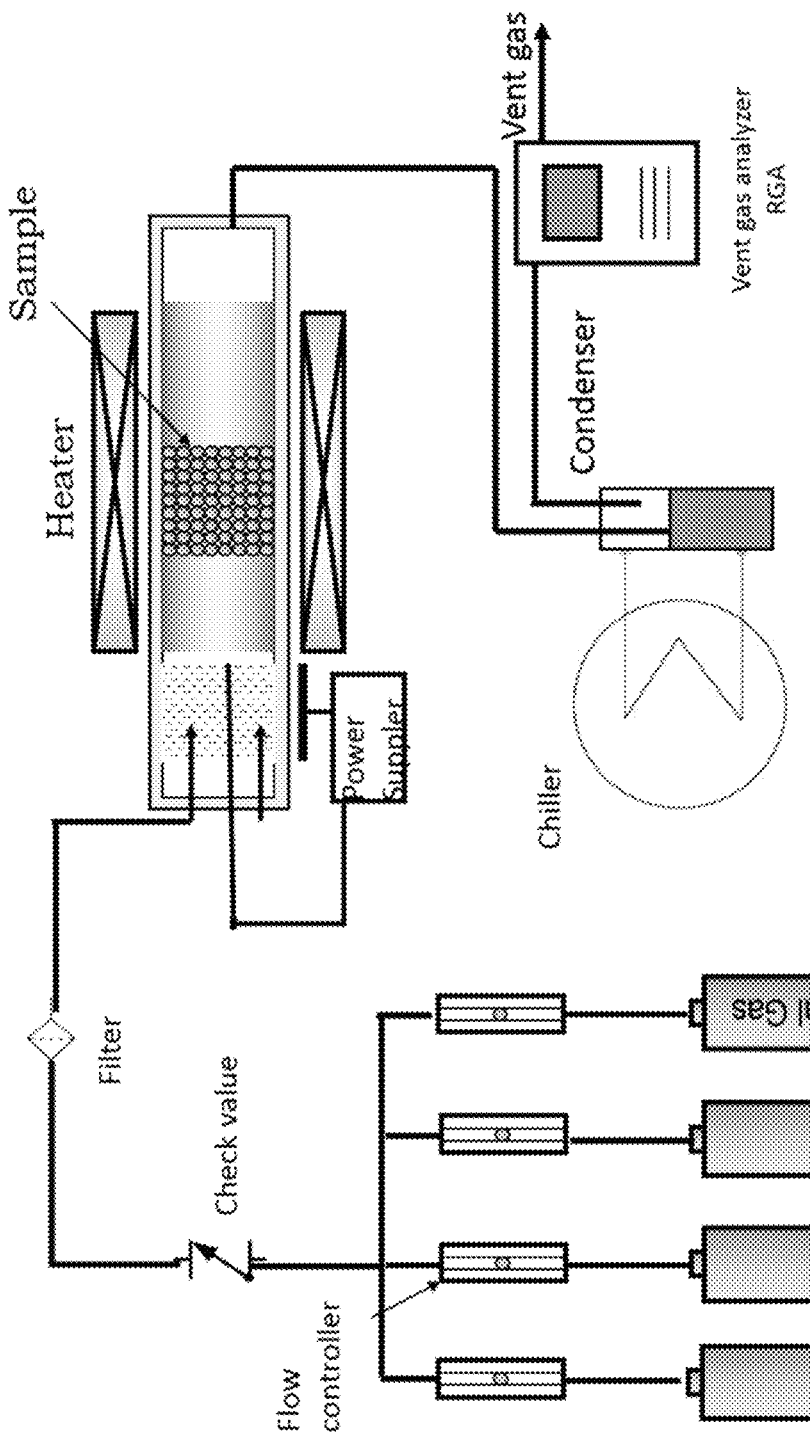
FIG. 15 shows a fixed bed reactor system for carrying out the formation of graphene-encapsulated metal nanoparticles from carbon-metal precursors and formation of graphene-based materials from graphene-encapsulated metal nanoparticles according to an illustrative embodiment.

Both the formation of the graphene-encapsulated metal nanoparticles from carbon-metal precursors and the graphene-based material may be conducted in a reactor system, e.g., a fixed bed reactor system. An illustrative such system is shown in FIG. 15. A portion of this system is also shown in the third panel and fourth panels of FIG. 14 to illustrate the thermal treatment of carbon-metal precursors to form graphene-encapsulated metal nanoparticles (panel 3) followed by formation of the graphene-based material (panel 4).

A variety of post-processing steps may be applied to the graphene-based materials. In embodiments, the graphene-based materials may be purified or otherwise treated to remove inorganic ash. This step can occur following heating and/or cooling of the graphene-based material. Post treatment may include the addition of nitrogen, sulfur, or other suitable elements or chemicals to the graphene-based materials to alter the materials' properties. Purification of cooled graphene-based materials may be achieved through water treatment, carbon dioxide treatment, steam treatment, hydrogen sulfide treatment, carbon disulfide treatment, ammonia treatment, basic solution treatment, acid purification, combinations thereof, and the like. This includes water and/or acid purification methods that are currently known in the art. In embodiments, purification includes exposing graphene-based materials to water and/or acid, and optionally boiling the materials in water and/or acid. In embodiments, graphene-based materials can further be filtered and/or rinsed one or more times. The purification may also be used to remove remaining metal particles from the graphene-based materials. In embodiments, purification may include washing the graphene-based materials with an acid solution, a basic solution, or ammonia.

The graphene-based materials formed according to the present methods may further be incorporated into various different products. For example, the graphene-based materials may form electrode materials for supercapacitors, fuel cells, and/or lithium-ion batteries; catalysts for renewable chemical/fuel production from biomass-derived syngas; adsorbents for biomass derived syngas cleaning and purification; adsorbents for heavy metal removal from contaminated water and soil; or a combination thereof.

U.S. Provisional Patent Application No. 62/443,207 is hereby incorporated by reference in its entirety. U.S. patent application Ser. No. 15/400,281, now U.S. Patent Publication No. 20170113936 is hereby incorporated by reference in its entirety. However, in case of conflict with these two references, the specification of this document, including definitions controls.

EXAMPLES

The presently-disclosed subject matter is further illustrated by the following specific but non-limiting examples. The following examples may include compilations of data that are representative of data gathered at various times during the course of development and experimentation related to the presently-disclosed subject matter.

Example A

Examples 1A-6A

Examples 1A-6A illustrate formation of precursors from kraft lignin with different metal catalysts.

Example 1A 300 grams of kraft lignin (provided by Domtar) was first added to 300 mL tetrahydrofuran in a 2000 mL glass beaker and the lignin-tetrahydrofuran mixture was stirred for 2 hours. 246.0 grams of iron (III) nitrate nonahydrate was added to 100 mL deionized (DI) water in a 500 mL glass beaker and the iron nitrate-water mixture was stirred until iron nitrate was dissolved completely. The iron nitrate solution drop-like (~2 mL/min) was added to the lignin-tetrahydrofuran mixture. The final mixture was stirred for 2 hours, followed by keeping it at room temperature for 24 h and oven-drying it at 110° C. for one day (12-24 hours).

Example 2A

Nickel promoted lignin precursor was prepared using an impregnation method. 100 grams of kraft lignin (provided by Domtar) was first added to 100 mL tetrahydrofuran in a 2000 mL glass beaker and the lignin-tetrahydrofuran solution was stirred for 2 hours. 56.2 grams of nickel nitrate hexahydrate [$Ni(NO_3)_2 \cdot 6H_2O$ from Sigma-Aldrich] was added to 50 mL DI water in a 500 mL glass beaker, and nickel nitrate-water mixture was stirred for 30 minutes. The nickel nitrate solution drop-like (~2 mL/min) was added to lignin-tetrahydrofuran solution. The final lignin-tetrahydrofuran-nickel nitrate mixture was stirred for 2 hours, followed by keeping the mixture at room temperature for 24 h, and then oven-drying it at 110° C. for one day.

Example 3A

Copper promoted lignin precursor was prepared using an impregnation method. 100 grams of kraft lignin (provided by Domtar) was first added to 100 mL tetrahydrofuran in a 2000 mL glass beaker and the lignin-tetrahydrofuran solution was stirred for 2 hours. 42.7 grams of copper nitrate tetrahydrate ($Cu(NO_3)_2.4H_2O$ from Sigma-Aldrich) was added to 50 mL DI water in a 500 mL glass beaker, and copper nitrate-water mixture was stirred for 30 minutes. The copper nitrate solution drop-like (~2 mL/min) was added to lignin-tetrahydrofuran solution. The final lignin-tetrahydrofuran-copper nitrate mixture was stirred for 2 hours, followed by keeping the mixture at room temperature for 24 h, and then oven-drying it at 110° C. for one day.

Example 4A

Cobalt promoted lignin precursor was prepared using an impregnation method. 100 grams of kraft lignin (provided by Domtar) was first added to 100 mL tetrahydrofuran in a 2000 mL glass beaker and the lignin-tetrahydrofuran mixture was stirred for 2 hours. 42.7 grams of cobalt nitrate hexahydrate ($Co(NO_3)_2.6H_2O$ from Sigma-Aldrich) was added to 50 mL DI water in a 500 mL glass beaker, and the cobalt nitrate solution was stirred for 30 minutes. The cobalt nitrate solution drop-like (~2 mL/min) was added to the lignin-tetrahydrofuran solution. The final lignin-tetrahydrofuran-cobalt nitrate mixture was stirred for 2 hours, followed by keeping the mixture at room temperature for 24 h, and then oven-drying it at 110° C. for one day.

Example 5A

Molybdenum promoted lignin precursor was prepared using an impregnation method. 100 grams of kraft lignin (provided by Domtar) was first added to 100 mL tetrahydrofuran in a 2000 mL glass beaker, and the lignin-tetrahydrofuran mixture was stirred for 2 hours. 46.4 grams of ammonium molybdate tetrahydrate ($(NH_4)_6Mo_7O_{24}.4H_2O$ from Sigma-Aldrich) was added to 100 mL DI water in a 500 mL glass beaker, and the ammonium molybdate solution was stirred for 30 minutes. The ammonium molybdate solution drop-like (~2 mL/min) was added to lignin-tetrahydrofuran solution. The final mixture was stirred for 2 hours, followed by keeping the mixture at room temperature for 24 h, and then oven-drying it at 110° C. for one day.

Example 6A

Tungsten promoted lignin precursor was prepared using an impregnation method. 100 grams of kraft lignin (provided by Domtar) was first added to 100 mL tetrahydrofuran in a 2000 mL glass beaker, and the lignin-tetrahydrofuran mixture was stirred for 2 hours. 32.4 grams of ammonium metatungstate hydrate ($(NH_4)_6H_2W_{12}O_{40}.xH_2O$ from Sigma-Aldrich) was added to 100 mL DI water in a 500 mL glass beaker, and ammonium metatungstate solution was stirred for 30 minutes. The ammonium metatungstate solution drop-like (~2 mL/min) was added to lignin-tetrahydrofuran solution. The final mixture was stirred for 2 hours, followed by keeping the mixture at room temperature for 24 h, and then oven-drying it at 110° C. for one day.

Examples 7A-9A

Examples 7A-9A illustrate preparation of precursors with different biomass sources.

Example 7A 246.0 grams of iron (III) nitrate nonahydrate from Sigma-Aldrich was added to 100 mL DI water in a 500 mL glass beaker and the iron nitrate mixture was stirred until the solid dissolves completely. The iron nitrate solution drop-like (~2 mL/min) was added to 100 g wood char, bamboo, rattan, or wood chips followed by stirring the mixture for 0.5 hours. Wood char was obtained from a typical fast pyrolysis process. Bamboo, rattan, and wood chips were dried in an oven at 105° C. overnight before use. The iron-biomass mixture was kept at room temperature for 24 h, and then oven-dried at 110° C. for one day.

Example 8A

Fifty grams of Iron (III) nitrate nonahydrate from Sigma-Aldrich was dissolved in 1000 mL DI water, followed by adding 100 grams of sugar, which were selected from glucose, xylose, arabinose, galactose, mannose, cellulose, hemicellulose, starch or mixture sugars from biomass hydrolysis process, to the iron (III) nitrate solution. The iron nitrate-sugar mixture was stirred for 0.5 hours and then transferred into a five-liter Parr reactor in which the mixture was heated at the temperature maintained at 160 to 180° C. for 8 hrs. After the reaction, a black product was collected and washed three times with DI water. The final washed product was oven-dried at 110° C. for 12 h.

Example 9A

Five grams of nonahydrate iron nitrate ($Fe(NO_3)_3.9H_2O$, from Sigma-Aldrich) was dissolved in 1000 ml 0.9 wt % cellulose nanofibrils solution. The mixture was stirred for 30 min, and then transferred into a 5-liter Parr reactor. The autoclave was sealed, the sample was heated and temperature was maintained at 180° C. for 10 hours. After the reaction, a black product was obtained. The product was collected and washed three times with DI water and ethanol to remove soluble ions and soluble residues. The final product was oven-dried at 110° C. overnight.

Example 10A

Example 10A illustrates the preparation of precursors with other solid carbon resources.

Active carbon or carbon black were used as the solid carbon resources. Iron-impregnated active carbon or carbon black was prepared by an incipient method. Forty grams (40 g) of active carbon/carbon black was added to 73.4% w/v iron nitrate solution. The iron loading was 20 wt %. The resulting solid carbon paste was kept at room temperature for 24 h and then dried at 110° C. in a convection oven overnight.

Examples 11A-14A

Examples 11A-14A illustrate preparation of graphene-encapsulated nanoparticles from the precursors formed according to Examples 1A-10A.

The dried metal-biomass precursors (20-100 g) from Examples 1A-10A were loaded to a 2-inch tubular reactor. The inert gas composition (either argon or nitrogen) was first introduced into the furnace at a flow rate of 50-200 mL/min for 30 minutes. The furnace was temperature-programmed with a rate of 5° C./min to 800-1000° C. and kept at the final temperature for 1 hours. The furnace is turned off and the samples are allowed to cool to ambient temperature naturally. Then the cooled sample is loaded into a ball mill machine and grounded in 1000 rpm for 30 minutes.

Example 11A

Example 11A examines various properties of iron-lignin samples at various stages of processing.

Figure 3:
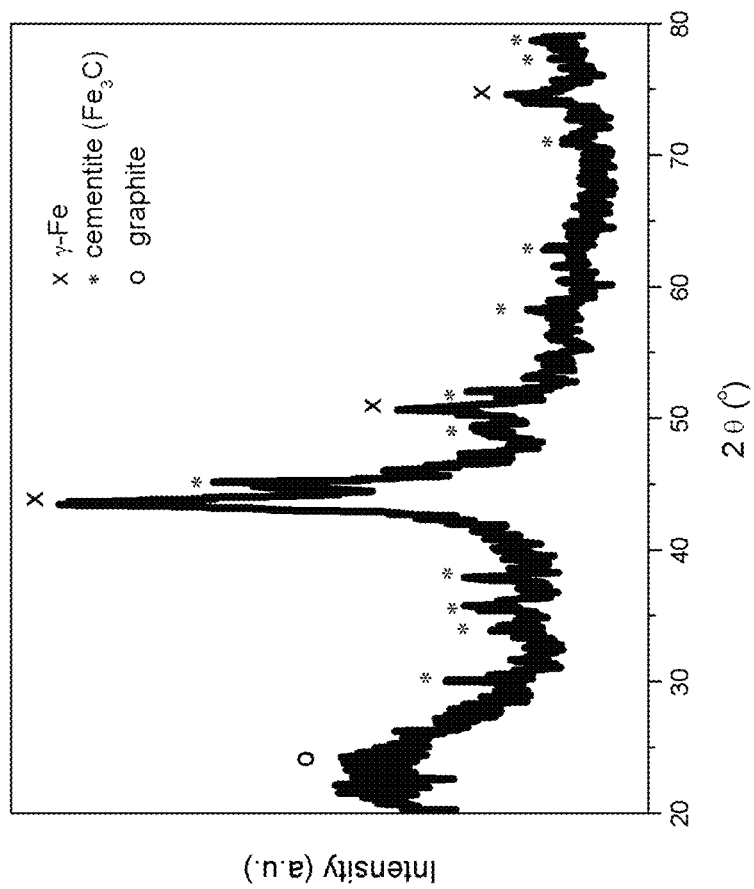
FIG. 3 is a plot of the X-ray diffraction (XRD) pattern of graphene-encapsulated iron nanoparticles.

FIG. 3 shows the x-ray diffraction (XRD) pattern of the Fe-lignin sample after thermal treatment under an argon flow at 1000° C. The figure shows three peaks at 43.50°, 50.64°, and 74.36° corresponding to the γ-iron (111), (2 0 0) and (2 2 0) planes. The peaks 37.75°, 40.7°, 42.6°, 43.75°, 44.56°, 44.94°, 45.86°, 49.12°, and 57.8° are assigned to cementite, $Fe_3C$, with correspondence planes of (1 2 1), (2 1 0), (2 0 1), (2 1 1), (1 0 2), (2 2 0), (0 3 1), (1 1 2), and (2 2 1), respectively. There is a peak at 26.55° which corresponds to graphite (002) plane observed for the sample, and this shows that graphene is formed after the sample is thermally treated at 1000° C.

Figures 4A, 4B:
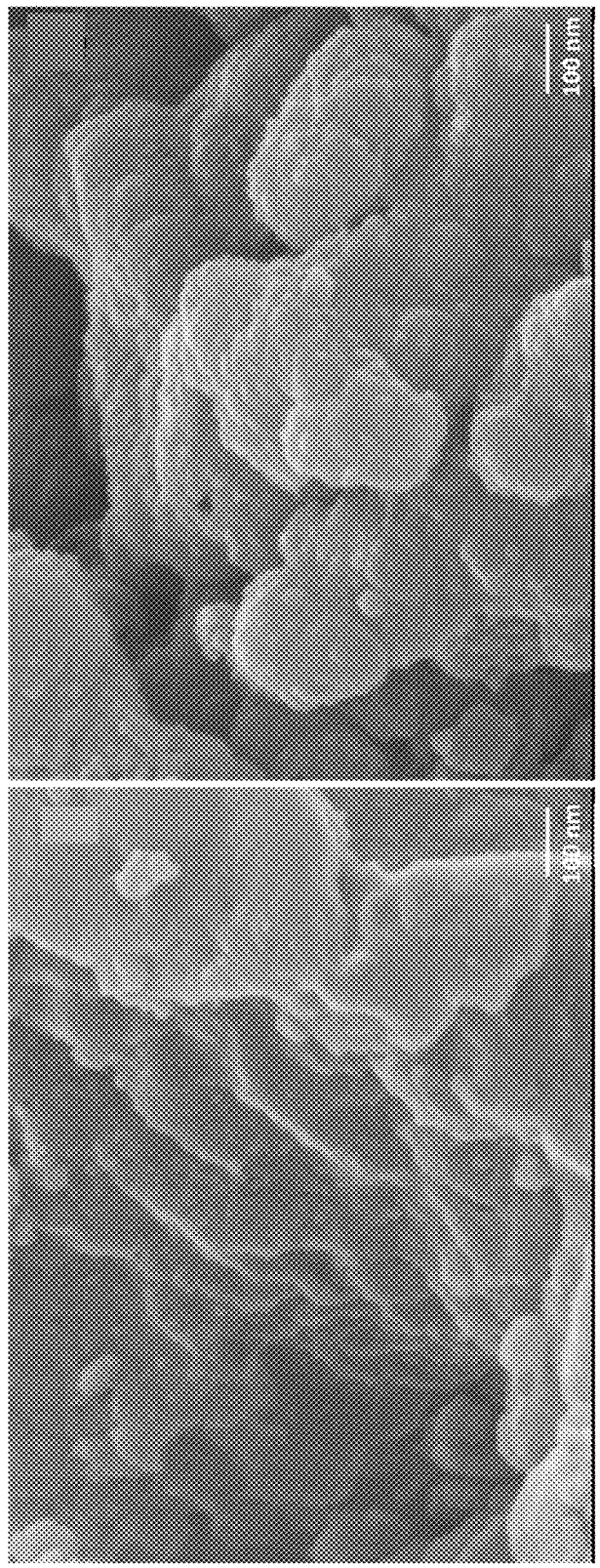
FIG. 4A is a scanning electron microscope (SEM) image of carbon (kraft lignin)-iron precursor.
FIG. 4B is a SEM image of the precursor after thermal treatment to form graphene-encapsulated iron nanoparticles.

FIG. 4A shows a scanning electron microscope (SEM) image of the Fe-promoted kraft lignin samples after drying at 105° C. FIG. 4B shows a SEM image after thermal treatment at 1000° C. under an argon flow for 1 hour. As shown in FIG. 4A, the surface of the dried sample is filled with porous nanoparticles. These nanoparticles have sizes ranging 2-8 nm. As shown in FIG. 4B, the thermally treated at 1000° C. sample is composed of nanoparticles. Spherically shaped particles with a uniform particle size are observed for the product. These particles have sizes in the range of from 5 to 10 nm in diameter. The XRD results of FIG. 3 prove these nanoparticles are composed of γ-Fe, iron carbide and graphene, i.e., the product includes graphene-encapsulated nanoparticles.

Figure 5A:
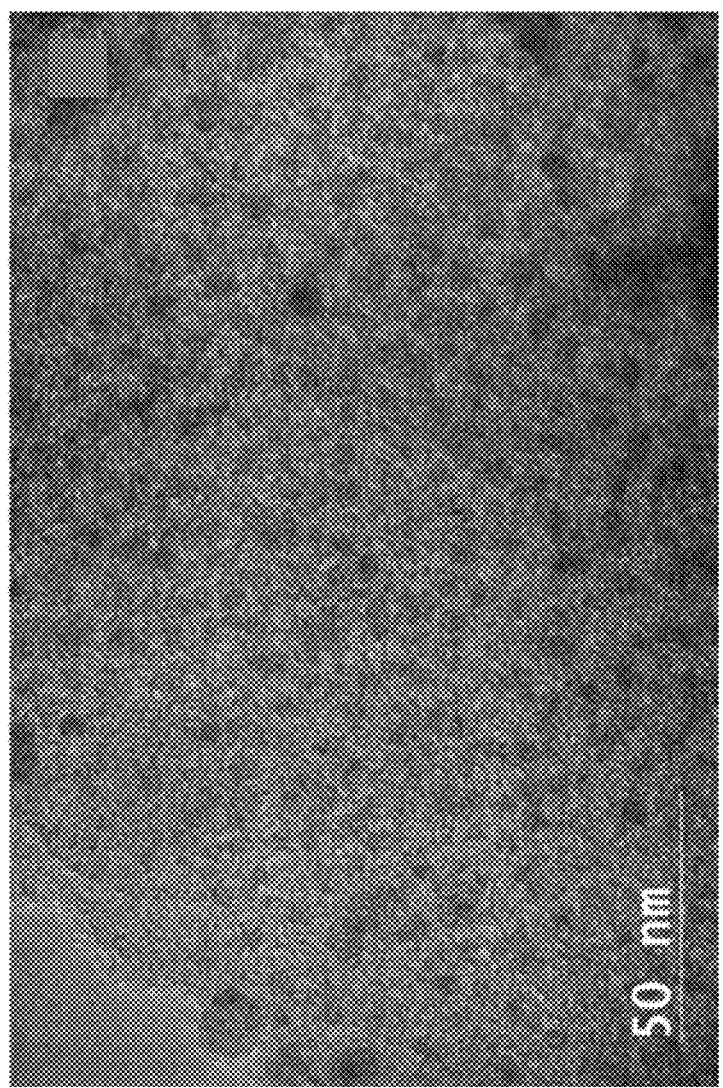
FIGS. 5A-5C are high-resolution transmission electron microscope (TEM) images of the graphene-encapsulated iron nanoparticles of FIG. 4B.
Figure 5B:
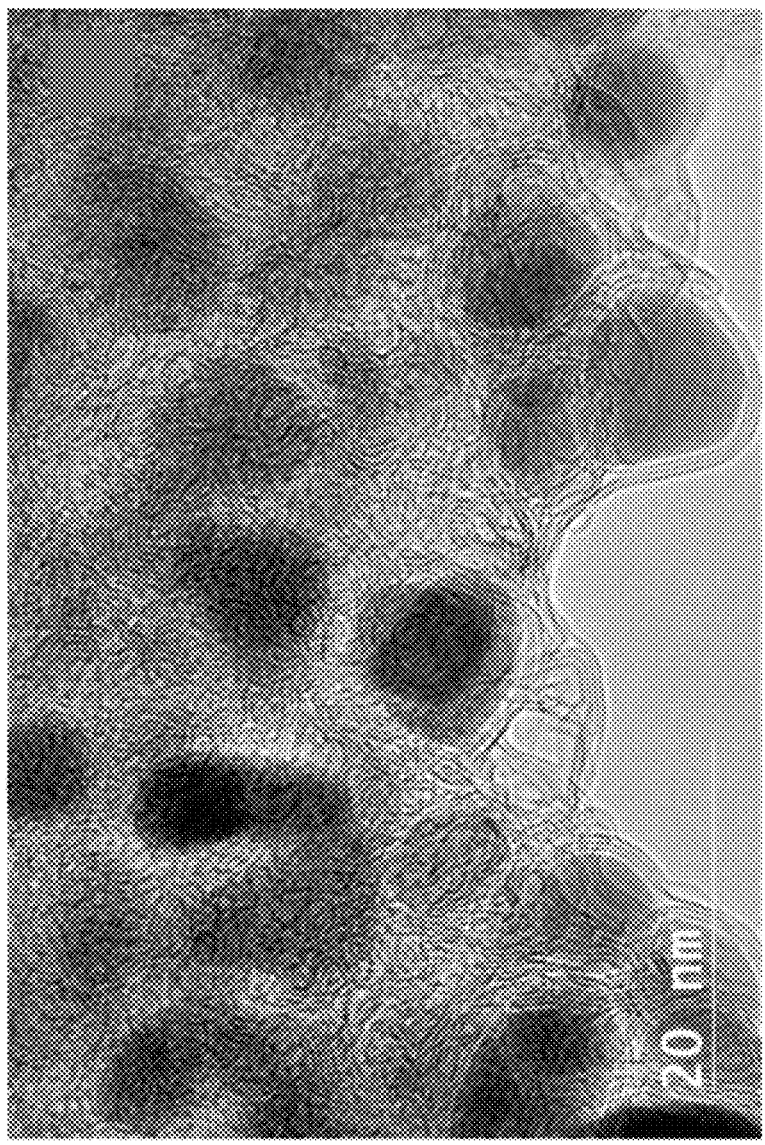
Figure 5C:
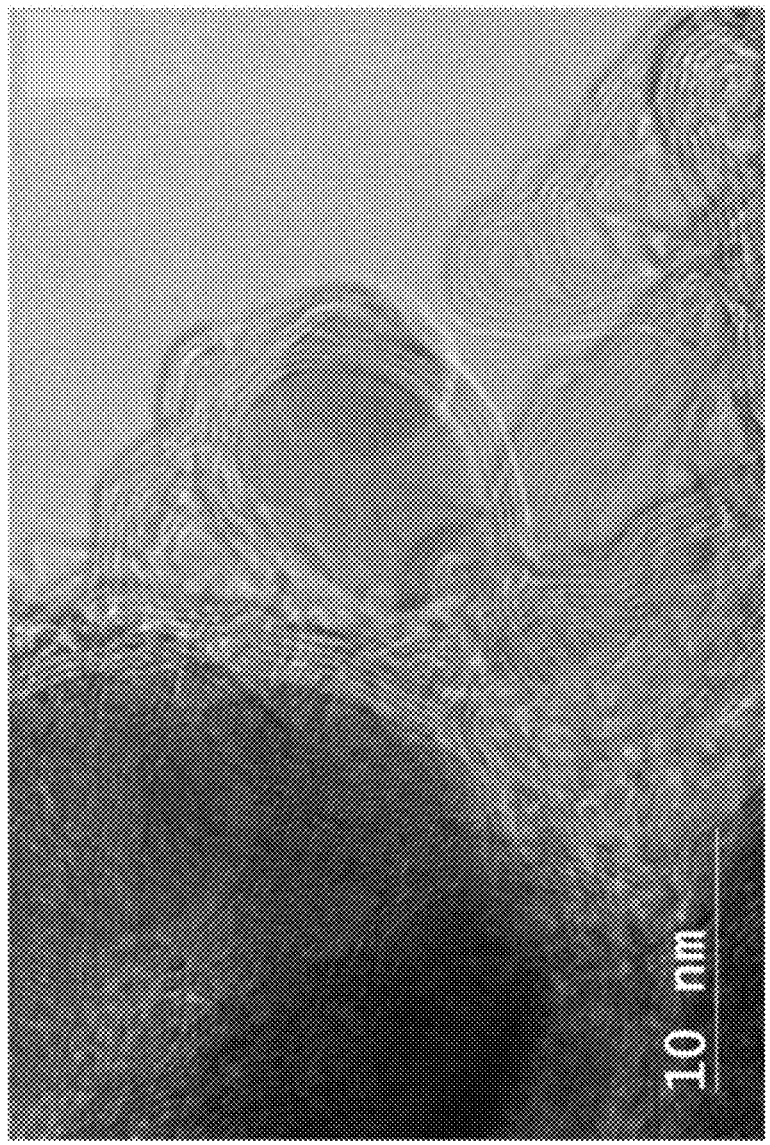

The transmission electron microscope (TEM) images of the Fe-promoted kraft lignin sample thermal treated at 1000° C. are shown in FIGS. 5A-5C. High-resolution TEM (HR-TEM) images show that the nanoparticles in the sample have a core-shell structure with the diameter of the core nanospheres being approximately 3-5 nm. The carbon shells exhibit ordered planes consistent with the structure of graphene. As shown in FIG. 5A, graphene-encapsulated Fe nanoparticles have uniform particle size and are homogenously embedded in the amorphous carbon framework (gray matrix). As shown in FIGS. 5B-5C, these core-shell structures contain onion-like graphitic carbon structure. The high graphitization degree of carbon can be attributed to the prominent catalytic ability of Fe towards carbonization.

Example 12A

Example 12A examines various properties of Cu-lignin samples at various stages of processing.

The copper-kraft lignin samples were also characterized by powder XRD (data not shown). The diffraction pattern of the sample calcined at 105° C. only had peaks attributed to copper oxide (CuO). For the sample thermally treated at 1000° C. under an argon flow for 1 hour, the strong diffraction peaks at 43.24°, 50.38°, and 74.03° were assigned to the (111), (200), and (220) planes of face centered cubic (fcc) Cu crystals, respectively, which indicates that Cu crystals were formed. The average diameter of the crystallites in the sample was estimated to be 7.3 nm.

SEM images of copper-promoted kraft lignin samples dried at 105° C. and thermally treated at 1000° C. under an argon flow for 1 hour, respectively, were also obtained (data not shown). The surface of the calcined sample was smooth and clean and no nanoparticles were observed on the surfaces. The surface morphology of the copper-promoted kraft lignin sample after thermally treated at 1000° C. were significantly different from the dried sample. The most obvious feature observed was the formation of nanoparticles over the surface of the thermally treated sample, wherein the nanoparticles diameters ranged from 5 to 10 nm. More micro-pores and micro-channels can be observed on the surface of the thermally treated sample.

The morphology and structure of the thermally treated samples were further characterized using HRTEM (data not shown). The nanoparticles had a spherical shape and were characterized by dark cores enclosed by light shells. Most of these encapsulated nanoparticles have core diameters of about 5-10 nm and the carbon shell is composed of 1-3 layers of graphene.

Example 13A

Example 13A examines various properties of Ni-lignin samples at various stages of processing.

XRD patterns of the calcined Ni-lignin samples before and after thermal treatment were obtained (data not shown). XRD examined in the 2θ range of 20°-80° for the calcined sample (before thermal treatment) showed that the diffraction peaks were attributable to NiO with face-centered cubic (fcc) phase at 2θ=37.40, 43.45, 62.95, 75.40 and 79.45, which can be related to (111), (200), (220), (311) and (222) crystal planes, respectively. For the thermally treated sample, the peaks observed at 2θ of 44.5°, 51.8° and 76.4° were characteristic of fcc nickel phases, corresponding (111), (200), and (220) planes, indicating that the Ni has a polycrystalline structure.

SEM images of the calcined Ni-lignin samples before and after thermal treatment were also obtained (data not shown). The dried Ni-lignin sample images showed amorphous structures in different sizes. The SEM morphology of nickel promoted lignin after thermal treatment at 1000° C. clearly showed that the shape and size of particles were quite different from the dried precursor. It was observed that the product is composed of fine spherical particles aggregated together. Images showing nano-flakes uniformly distributed on the surface of the sample with sizes in the range of from 30 to 70 nm were also observed.

HRTEM images of the thermally-treated nickel-promoted lignin samples were also obtained (data not shown). The images indicated that the thermally treated samples were composed of nanoparticles. The majority nanoparticles had a narrow particle size distribution in a range from 2 to 5 nm, and were encapsulated with 1-3 layers of graphene. Some nanoparticles had a quasi-spherical shape and dark cores enveloped by 5-20 layers of concentric shells. Those nanoparticles had a diameter ranging from 10 to 20 nm.

Example 14A

Example 14A examines various properties of Mo-lignin samples at various stages of processing.

XRD patterns of the Mo-lignin samples thermally treated at 1000° C. were obtained (data not shown). The pattern was consistent with that of the β-$Mo_2C$ hexagonal phase, with 2θ peaks located at 34 3° (100), 39.6° (101), 37.8° (002), 52.3° (102), 34.4° (100), 61.5° (110), 69.8° (103), and 74.5° (112), respectively. Additionally, the average crystallite size determined by (101) peak using Scherrer formula, was found to be 10.7 nm.

SEM images of Mo-promoted kraft lignin samples dried at 105° C. and thermally treated at 1000° C. under an argon flow for 1 hour, respectively, were obtained (data not shown). The surface of the dried sample was smooth and clean and no nanoparticles were observed on the surfaces of the dried sample. The morphology of Mo-promoted kraft lignin samples thermally treated at 1000° C. were significantly different. It was observed that the thermally treated sample was composed of nanoparticles with sizes in the range of from 5 to 10 nm. The XRD result proves these nanoparticles are molybdenum carbide.

HRTEM images of the thermally treated molybdenum-promoted kraft lignin samples were also obtained (data not shown). The images show that the samples have nanoparticles with sizes ranging from ca. 5 nm to 15 nm which are encapsulated in 1-15 layers of graphene. TEM micrographs of a $\beta$-Mo$_2$C nanoparticle show d-spacing values of 0.221 nm for the (101) crystallographic planes. The HRTEM image showed 1-3 layers of graphene over the (101) plane. TEM micrographs of another $\beta$-Mo$_2$C nanoparticle show d-spacing values of 0.2595 nm for the (110) planes. The HRTEM image showed more than 10 layers of graphene over the (101) plane.

Example 15A

Example 15A illustrates various properties of Fe-wood char samples at various stages of processing.

Figure 6:
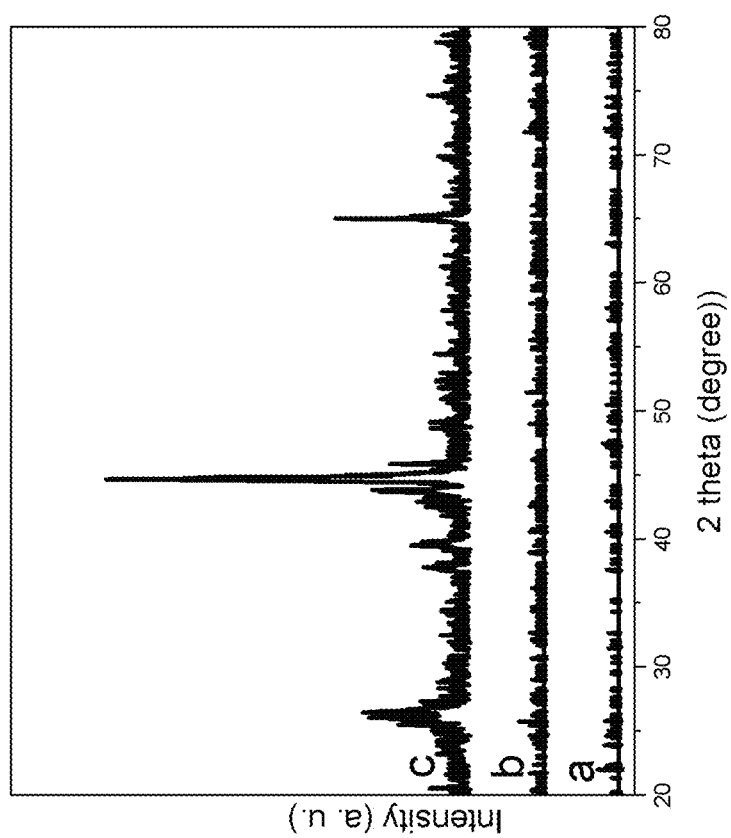
FIG. 6 is a plot of the XRD pattern of wood char (scan a), carbon (wood char)-iron precursor prior to thermal treatment (scan b), and after thermal treatment to form graphene-encapsulated iron nanoparticles (scan c).

FIG. 6 shows the XRD patterns of the fresh wood char (no iron ion pre-impregnation treatment) (scan a), the wood char after iron ion pre-impregnation treatment but no heat treatment (scan b), and the thermally treated iron-promoted wood char (scan c). The wood chars without heat treatment (scans a and b) do not show any diffraction peaks. For the XRD pattern of the thermally-treated, iron-promoted wood char (scan c), the decrease in intensity of two peaks at 44.68° and 65.03° corresponding to the $\alpha$-iron (110) and (200) planes respectively confirms the participation of iron during catalytic conversion. The peak at 26.55° may correspond to carbon (002) plane, which means the iron-promoted char is converted to graphite after the thermal treatment.

The peaks at values of 2θ equal to 37.75, 40.7, 42.6, 43.75, 44.56, 44.94, 45.86, 49.12, 57.8, 70.9, 77.9 and 78.6° are assigned to cementite, Fe$_3$C, corresponding to the following crystallographic planes: (121), (210), (201), (211), (102), (220), (031), (112), (221), (301), (123), (401), and (133), respectively.

Figure 7A:
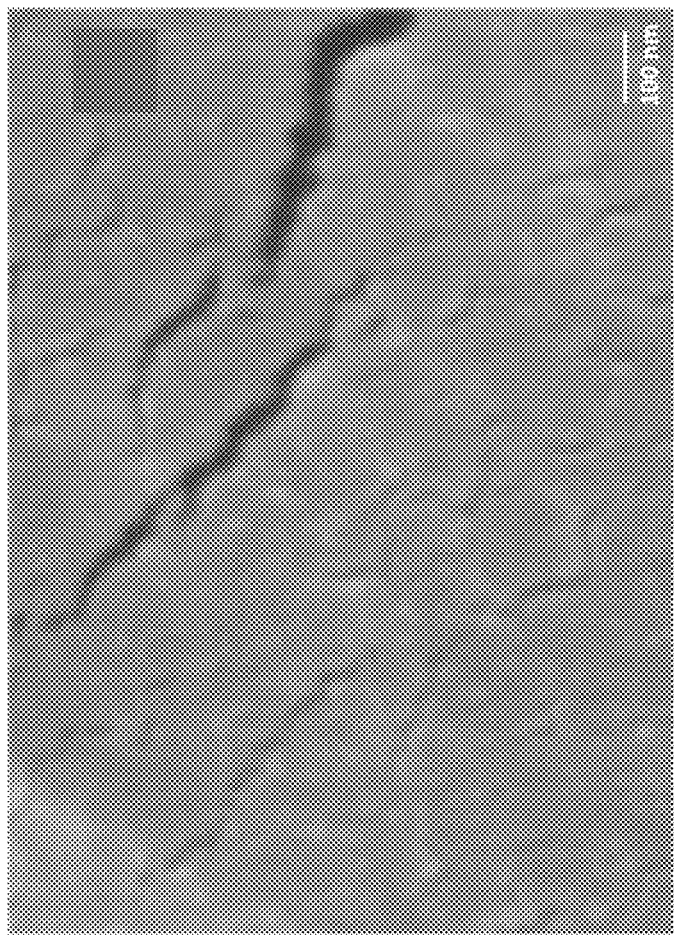
FIG. 7A is an SEM image of wood char.
Figure 7B:
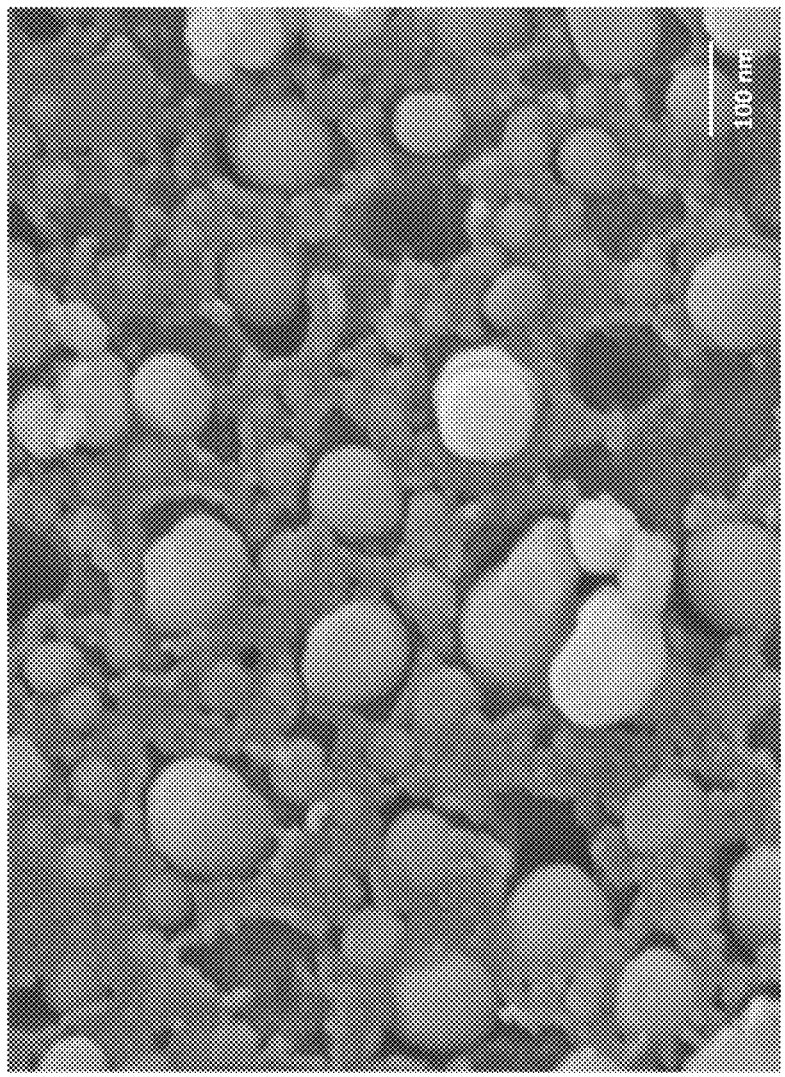
FIG. 7B is an SEM image of carbon-iron precursor after thermal treatment to form graphene-encapsulated iron nanoparticles.

FIG. 7A shows the SEM image of an untreated wood char having a clean and smooth surface. FIG. 7B shows the SEM image of a thermally treated sample, showing spherically shaped nanoparticles having sizes ranging from 20 to 80 nm. The nanoparticles are uniformly distributed over the surface of the thermal treated iron promoted wood char samples. These nanoparticles formed either half-embedded in the wood char or completely enclosed in the wood char matrix. Both the nanoparticles and the wood char matrix have a porous structure.

Figure 8:
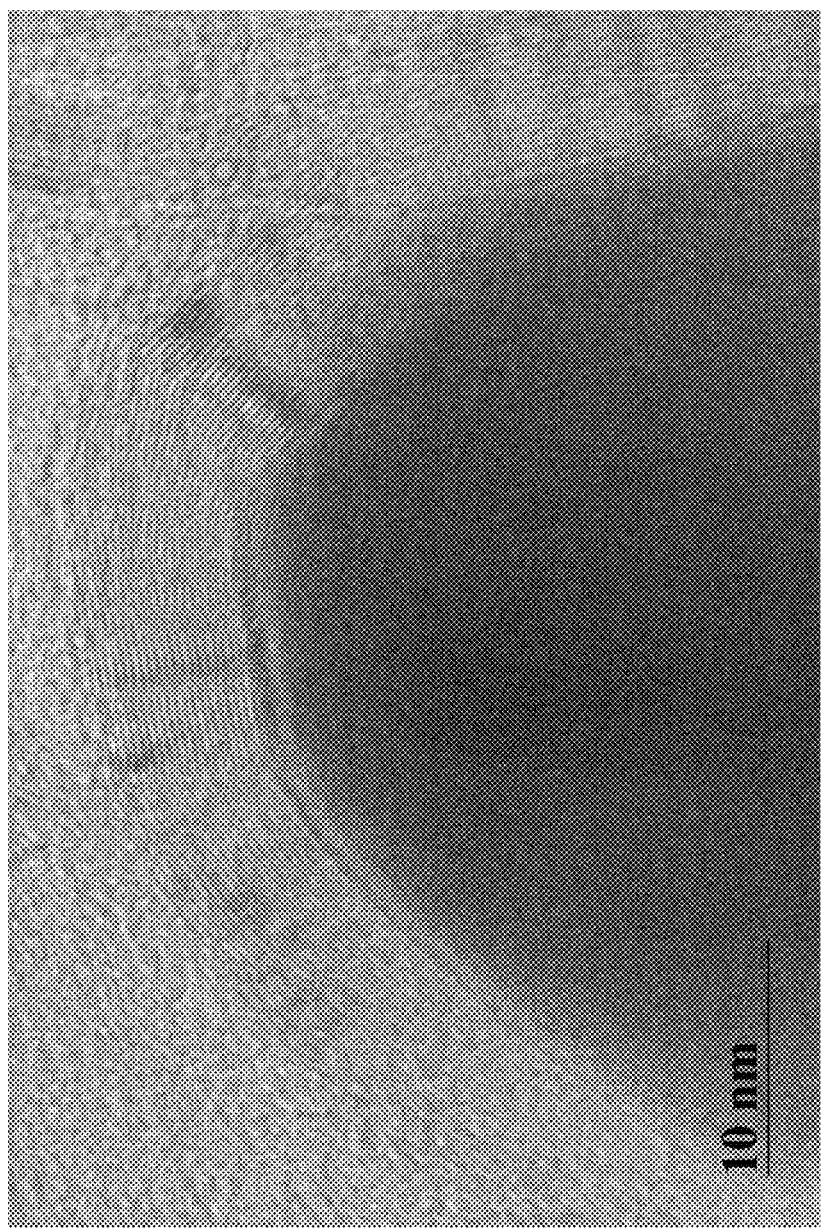
FIG. 8 is an HRTEM image of a single graphene-encapsulated iron nanoparticle of FIG. 7B.

FIG. 8 shows a HRTEM image of a nanoparticle from the thermally treated sample which displays a highly-ordered structure of the outer shell consisting of 10 to 20 graphene layers. The average distance between these single planes is 0.335 nm, which corresponds to the (002) plane of a graphite sample with an interlayer spacing of 0.335 nm. These nanoparticles can be interpreted as iron cores encapsulated with multilayer graphene shell structure.

Example 16A

Example 16A illustrates various properties of wood derived sugar samples at various stages of processing.

As described above (Example 8A), carbon-encapsulated iron nanoparticles were synthesized hydrothermally by the reduction of Fe$^{2+}$ in a pine wood derived sugar solution. Next, the carbon-encapsulated iron nanoparticles were thermally treated under a nitrogen flow at 1000° C. XRD patterns were obtained (data not shown). There were negligible diffraction peaks observed for the fresh sample, indicating that both the core and the shell are in an amorphous structure.

The pattern of the sample thermally treated under a N$_2$ flow at 1000° C. shows one peak at 44.68° corresponding to the $\alpha$-iron (110) plane. The peaks 37.75°, 40.7°, 42.6°, 43.75°, 44.56°, 44.94°, 45.86°, 49.12°, and 57.8° are assigned to cementite, Fe$_3$C, with correspondence planes of (121), (210), (201), (211), (102), (220), (031), (112), and (221), respectively.

SEM images were obtained (data not shown). The images indicate that the carbon-encapsulated iron-core nanoparticles have a spherical shape, a uniform particle size, and a porous surface. The diameters of the fresh (prior to thermal treatment) core-shell structures are between 100 and 200 nm. The calcined samples show that nanoparticles have a uniform size of about 50-100 nm. The nanoparticles of the calcined samples show a more uniform distribution as compared to the fresh samples.

HRTEM images were obtained (data not shown). The images show that the diameters of the core of the nanoparticles in the thermally treated samples are about approximately 10-20 nm. The carbon shell exhibits a graphene structure, i.e., ordered planes of the natural graphite structure were observed.

Example 17A

Example 17A illustrates various properties of samples prepared from cellulose nanofibrils at various stages of processing.

As described above (Example 9A), carbon-encapsulated iron nanoparticles were synthesized hydrothermally by the reduction of Fe$^{2+}$ in a wood-derived cellulose nanofibrils solution. Then, the carbon-encapsulated iron nanoparticles were calcined under an argon flow at 300° C., followed by thermal treatment in an argon flow at 1000° C. XRD patterns were obtained (data not shown). There were no diffraction peaks observed for the fresh sample (prior to thermal treatment), which indicates that no crystal structures were formed either in the core or the shell; instead the core/shell exhibits an amorphous structure.

For the calcined sample, XRD patterns show peaks at 30.10°, 35.42°, 37.05°, 43.05°, 53.40°, 56.95°, 62.51°, and 73.95°, which are assigned to cubic-phase FeO.Fe$_2$O$_3$ (Fe$_3$O$_4$). No signals for metallic iron or other iron oxides were detected in the XRD pattern, which indicates the partial reduction reaction occurred, i.e., Fe$^{3+}$ is partially reduced to Fe$^{2+}$ to form mixed iron oxide, Fe$_3$O$_4$. Scherrer analysis was performed on high intensity Bragg peak (311) of Fe$_3$O$_4$, and the mean crystallite size is calculated to be 5.5 nm.

For the nanoparticles sample thermally treated at 1000° C., a sharp peak is observed at 44.68°; and the peaks at 44.68° and 65.03° correspond to the $\alpha$-iron (110) and (200) planes, respectively. The peak at 26.55° may correspond to graphite (002) plane, meaning carbon precursors in the sample are converted to graphite after carbonization. The peaks at 43.9°, 51.2° and 75.3° correspond to the $\gamma$-Fe lattice. The peaks 37.75°, 40.7°, 42.6°, 43.75°, 44.56°, 44.94°, 45.86°, 49.12°, 57.8°, 70.9°, 77.9° and 78.6° are assigned to cementite, Fe$_3$C.

SEM images of fresh samples (prior to thermal treatment) showed spherically shaped agglomerates with a uniform size (data not shown). Individual nanoparticles exhibited a porous structure surface and diameters between 200 and 300 nm.

SEM images of the samples thermally treated at 1000° C. for 1 hour shows the spherical agglomerates (200-300 nm) are composed of 5-20 nm particles. These carbonized samples show more uniform distribution compared to the fresh ones.

HRTEM images of the carbonized (thermally treated) samples indicate that products are mainly graphene-encapsulated iron particles with a diameter of 5-20 nm. The nanoparticles have spherical shape and dark cores enclosed by light shells. Most of these graphene-encapsulated nanoparticles have core diameters of about 3-20 nm and the carbon shell is composed of 3-10 layers of graphene. The particle size distribution is as follows: more than 50% are distributed between 5-10 nm and (~30%) are distributed between 11-15 nm (~30%).

Example 18A

Example 18A illustrates the formation of graphene-based materials from the graphene-encapsulated nanoparticles (GEMNs) formed according to Examples 11A-17A.

Fifty grams (50 g) of the GEMNs were packed in the middle of a 2-inch OD ceramic tubular reactor. Argon (99.9% purity) was first introduced into the reactor at a flow rate of 20 mL/min for 30 minutes. The reactor was temperature-programmed with a heating rate of 5° C./min to 800° C. and kept at 800° C. for 30 minutes. The furnace was then continually heated up by 30° C./min to 1000° C. with an argon flow rate of 20 mL/min and $CH_4$ at flow rate of 80 mL/min and kept at 1000° C. for 1 hour. The furnace was cooled down by 10° C./min to room temperature under a flow of 50 mL/min argon. The results (yield of graphene-based material) are listed in Table 1.

TABLE 1

Graphene-based materials from graphene-encapsulated transition metal nanoparticles. The "@C" indicates the carbon (graphene)-encapsulation.

| | Cracking and welding gas | | |
|---|---|---|---|
| GEMNs precursors | Ar. gas (mL/min) | Cracking and welding molecular gas ($CH_4$) (mL/min) | Graphene nanomaterial yield (%) |
| Fe@C from Fe-lignin | 20 | 80 | 98.3 ± 1.8 |
| Ni@C from Ni-lignin | 20 | 80 | 97.1 ± 1.5 |
| Cu@C from Cu-lignin | 20 | 80 | 90.3 ± 0.9 |
| $Mo_2C$@C from Mo-lignin | 20 | 80 | 89.1 ± 0.8 |
| Fe@C from Fe-wood char | 20 | 80 | 96.2 ± 1.5 |
| Fe@C from Fe-bamboo chips | 20 | 80 | 95.3 ± 1.4 |
| Fe@C from Fe-wood chips | 20 | 80 | 93.1 ± 1.5 |
| Fe@C from Fe-rattan chips | 20 | 80 | 95.3 ± 1.4 |
| Fe@C from Fe-cellulose nanofibrils (hydrothermal process) | 20 | 80 | 93.1 ± 1.7 |
| Fe@C from Fe-sugar (hydrothermal process) | 20 | 80 | 92.3 ± 1.9 |
| Fe@C from Fe-active carbon | 20 | 80 | 97.1 ± 0.8 |
| Fe@C from Fe-carbon black | 20 | 80 | 96.2 ± 0.7 |

Figures 9A, 9B:
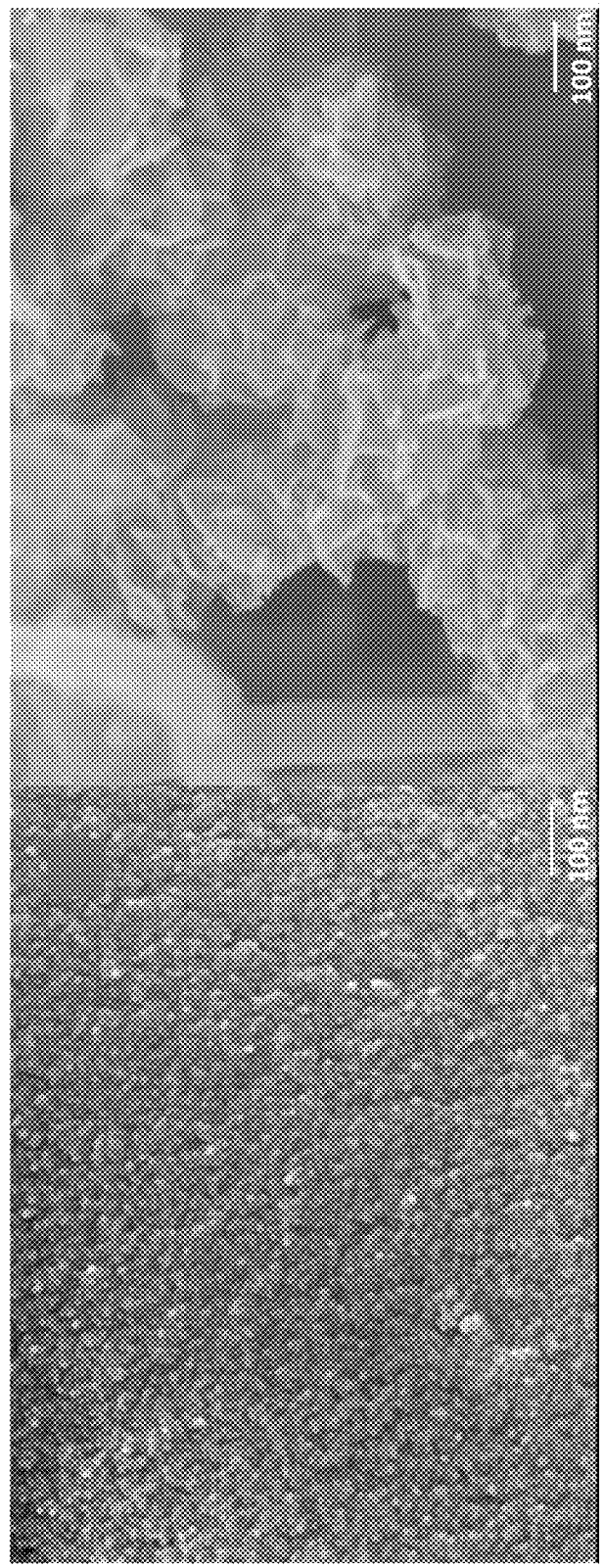
FIG. 9A is an SEM image and FIG. 9C is an TEM image of graphene-encapsulated iron nanoparticles from Fe-lignin prior to exposure to the cracking and welding gas composition Ar/CH$_4$.
FIG. 9B is an SEM image and FIG. 9D is an TEM image of graphene-encapsulated iron nanoparticles from Fe-lignin after exposure to the cracking and welding gas composition Ar/CH$_4$.
Figures 9C, 9D:
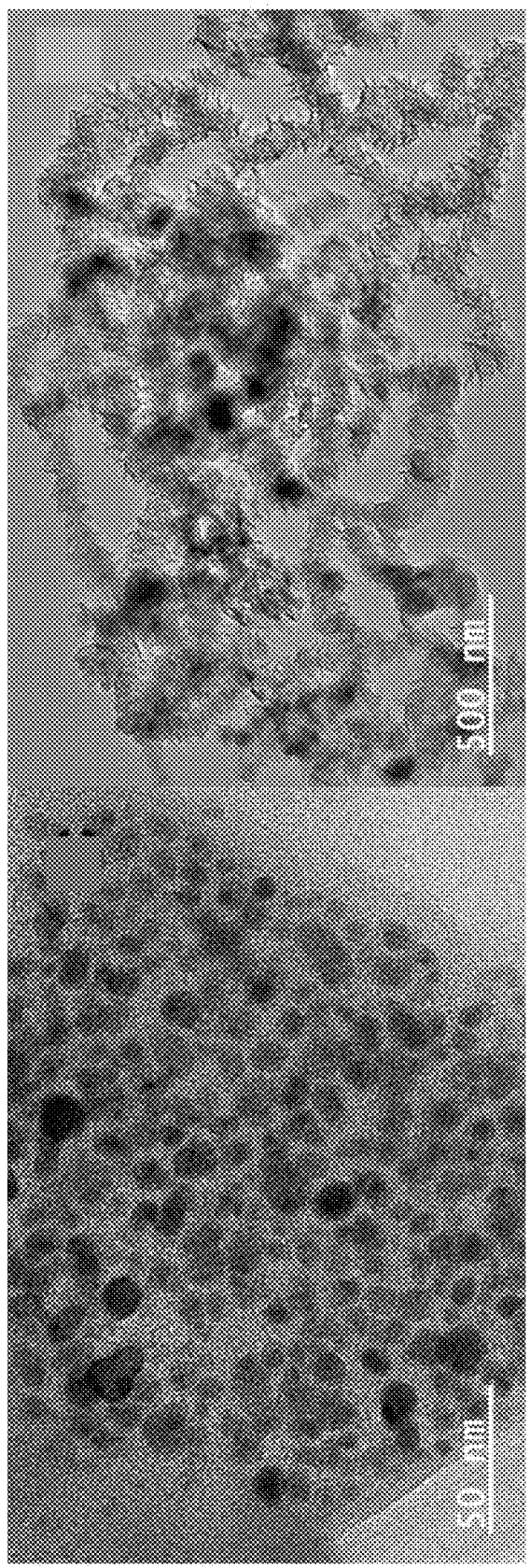
Figure 9E:
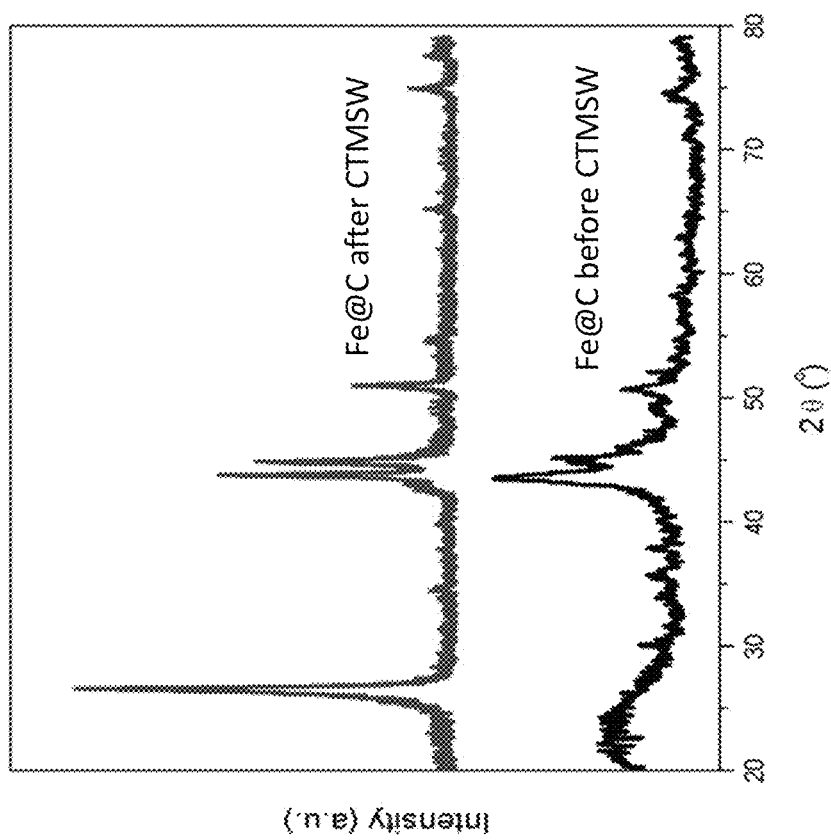
FIG. 9E shows the XRD results for the graphene-encapsulated iron nanoparticles from Fe-lignin prior to and after exposure to the cracking and welding gas composition Ar/CH$_4$.

XRD, SEM, and TEM data was obtained for the resulting graphene-based materials. Illustrative data is shown in FIGS. 9-12. FIG. 9A is an SEM image and FIG. 9C is an TEM image of Fe@C from Fe-lignin prior to exposure to the cracking and welding gas composition Ar/$CH_4$. FIG. 9B is an SEM image and FIG. 9D is an TEM of Fe@C from Fe-lignin after exposure to the cracking and welding gas composition Ar/$CH_4$. FIG. 9E shows the XRD results for the Fe@C prior to and after exposure to the cracking and welding gas composition Ar/$CH_4$. The results show that the Ar/$CH_4$ cracking and welding gas composition provides a graphene-based material comprising graphene chains.

Figures 10A, 10B:
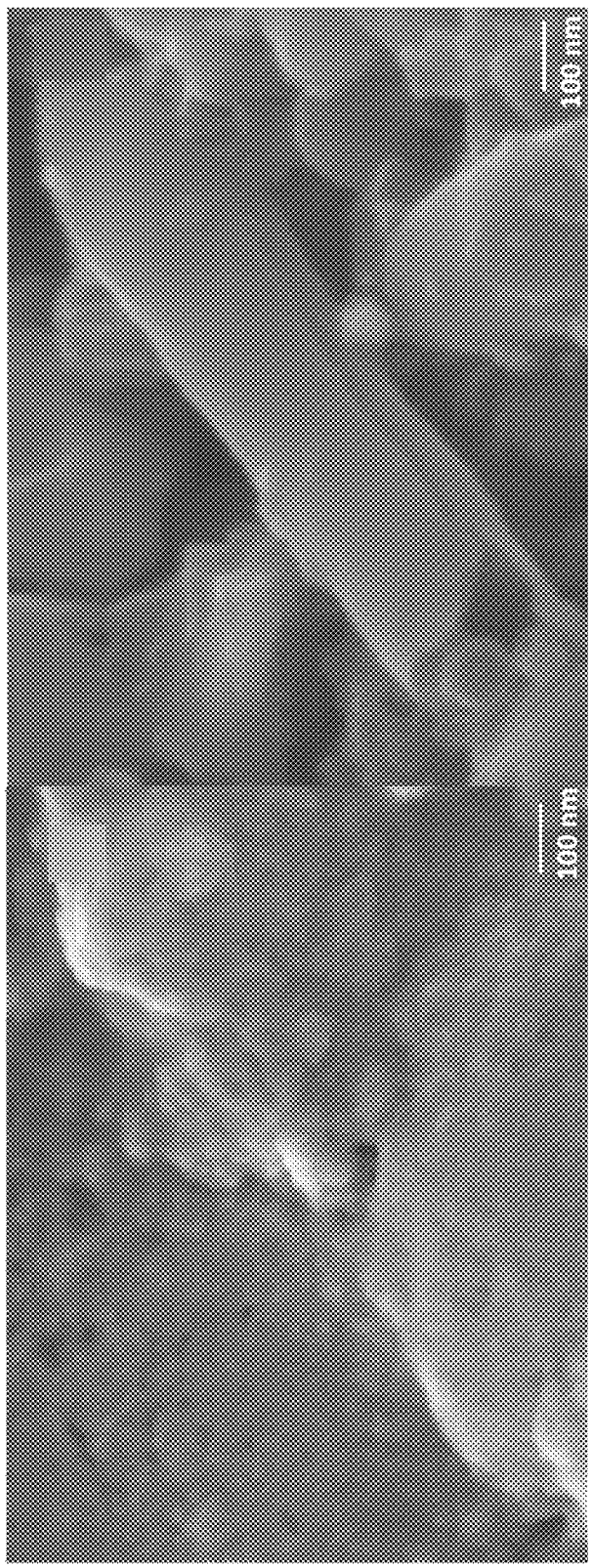
Figure 10E:
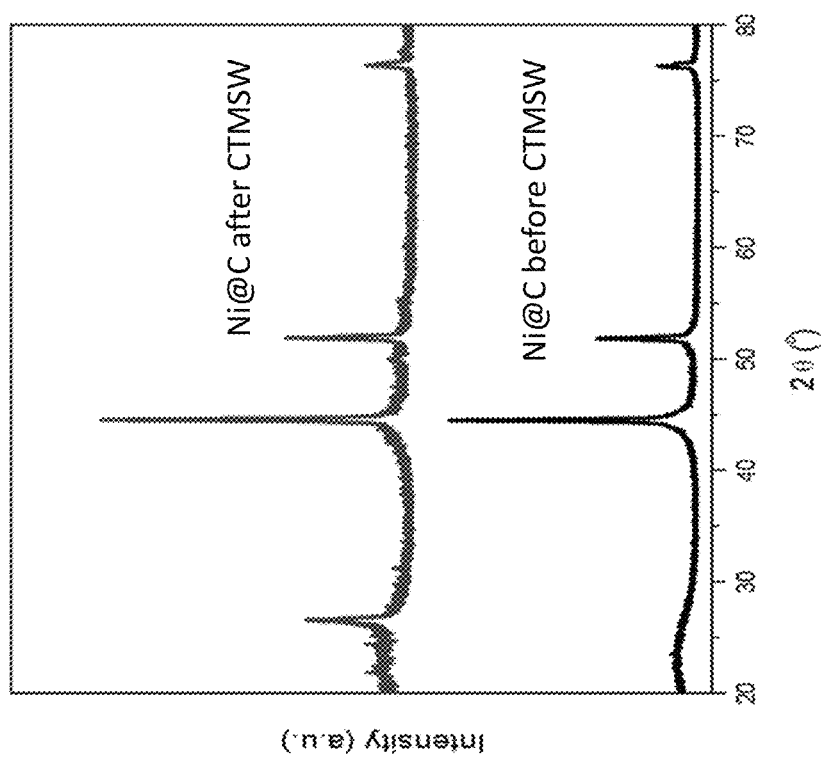
FIG. 10E shows the XRD results for the graphene-encapsulated nickel nanoparticles prior to and after exposure to the cracking and welding gas composition Ar/CH$_4$.

FIG. 10A is an SEM image and FIG. 10C is an TEM image of Ni@C from Ni-lignin prior to exposure to the cracking and welding gas composition Ar/$CH_4$. FIG. 10B is an SEM image and FIG. 10D is an TEM image of Ni@C from Ni-lignin after exposure to the cracking and welding gas composition Ar/$CH_4$. FIG. 10E shows the XRD results for the Ni@C prior to and after exposure to the cracking and welding gas composition Ar/$CH_4$. The results show that the Ar/$CH_4$ cracking and welding gas composition provides a graphene-based material comprising curved graphene sheets.

Figures 11A, 11B:
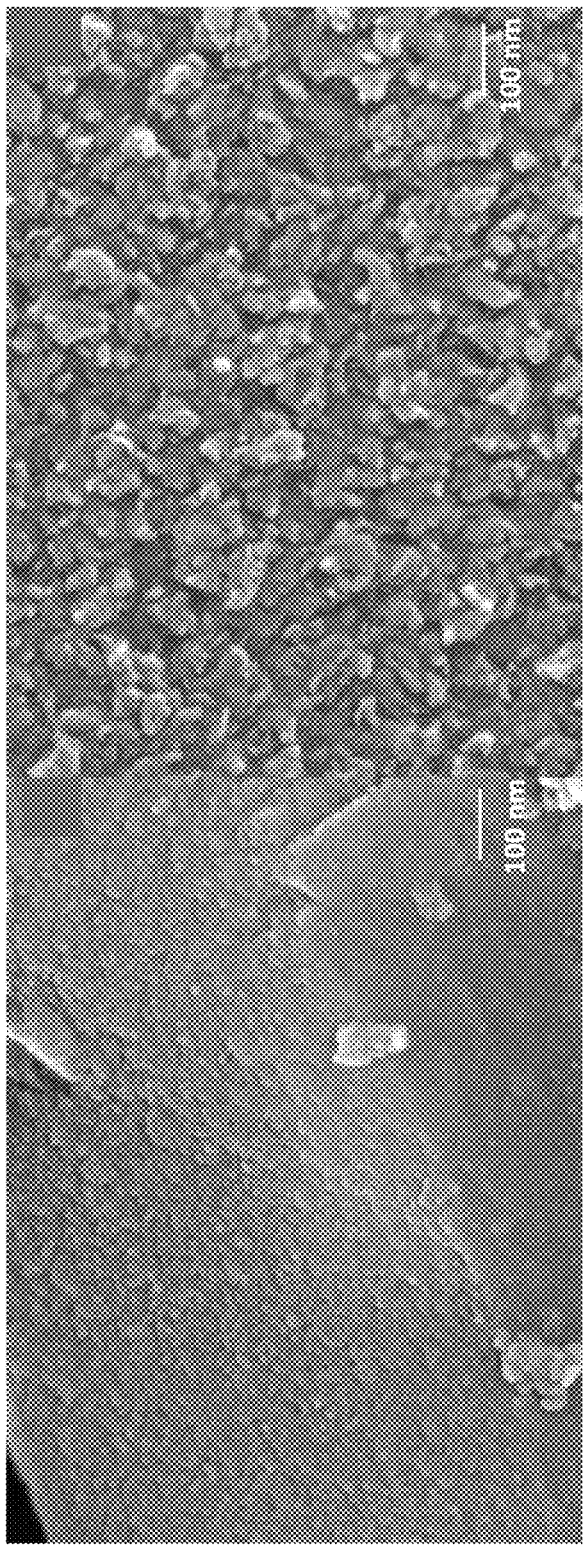
FIG. 11A is an SEM image and FIG. 11C is an TEM image of graphene-encapsulated molybdenum nanoparticles from Mo-lignin prior to exposure to the cracking and welding gas composition Ar/CH$_4$.
FIG. 11B is an SEM image and FIG. 11D is an TEM image of graphene-encapsulated molybdenum nanoparticles from Mo-lignin after exposure to the cracking and welding gas composition Ar/CH$_4$.
Figures 11C, 11D:
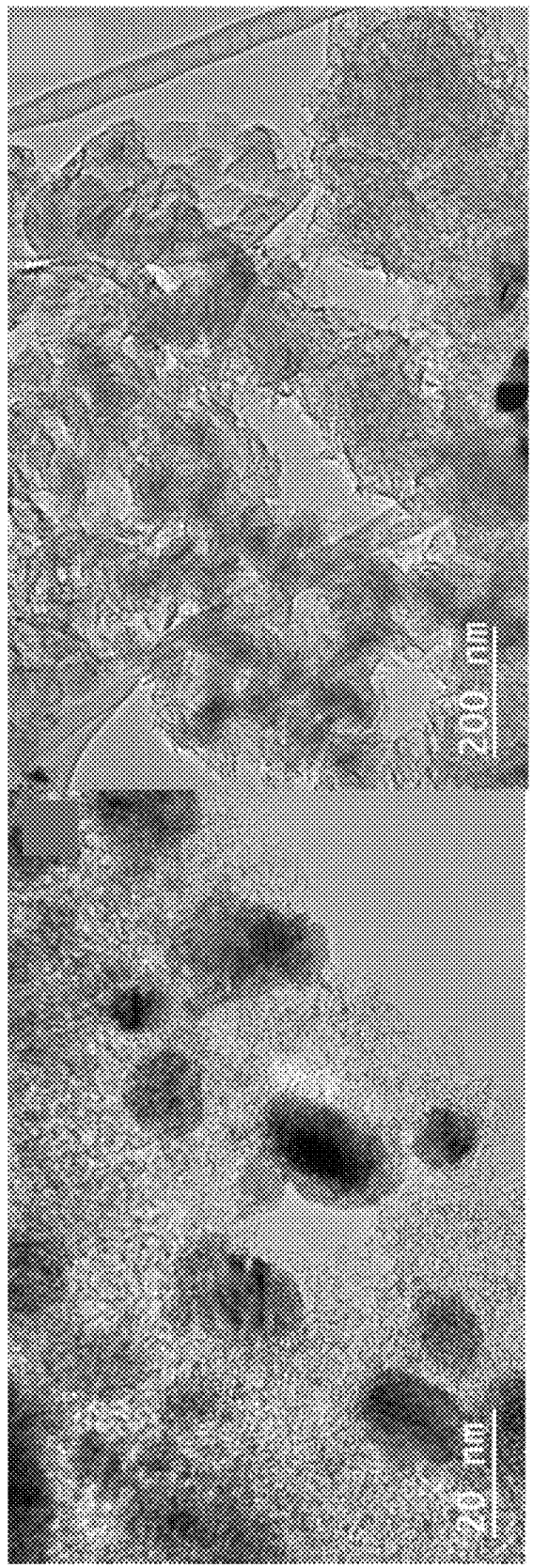
Figure 11E:
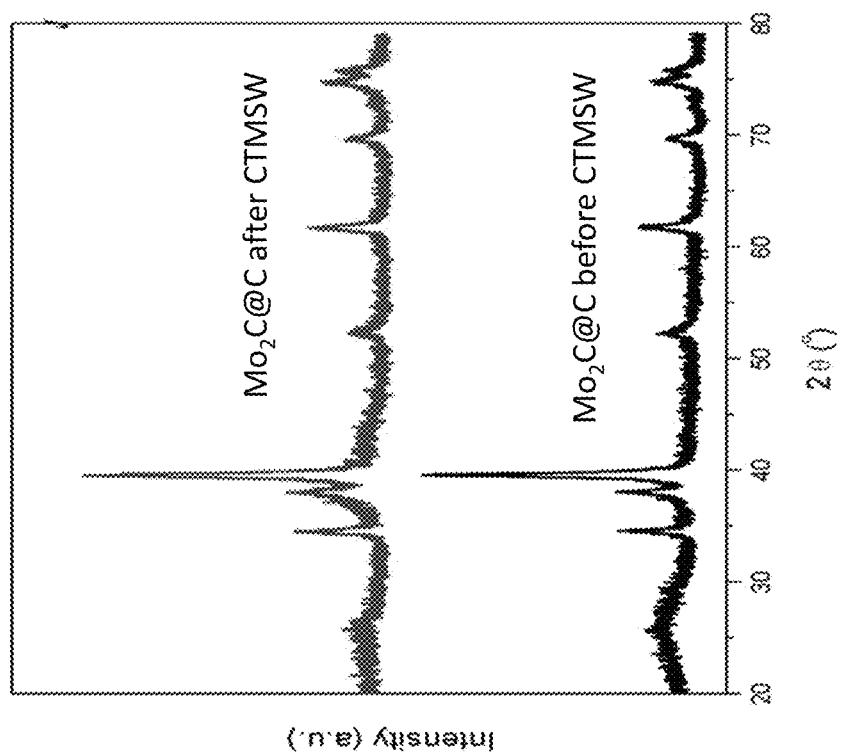
FIG. 11E shows the XRD results for the graphene-encapsulated molybdenum nanoparticles prior to and after exposure to the cracking and welding gas composition Ar/CH$_4$.

FIG. 11A is an SEM image and FIG. 11C is an TEM image of $Mo_2C$@C from Mo-lignin prior to exposure to the cracking and welding gas composition Ar/$CH_4$. FIG. 11B is an SEM image and FIG. 11D is an TEM image of $Mo_2C$@C from Mo-lignin after exposure to the cracking and welding gas composition Ar/$CH_4$. FIG. 11E shows the XRD results for the $Mo_2C$@C prior to and after exposure to the cracking and welding gas composition Ar/$CH_4$. The results show that the Ar/$CH_4$ cracking and welding gas composition provides a graphene-based material comprising fluffy graphene.

Figures 12A, 12B:
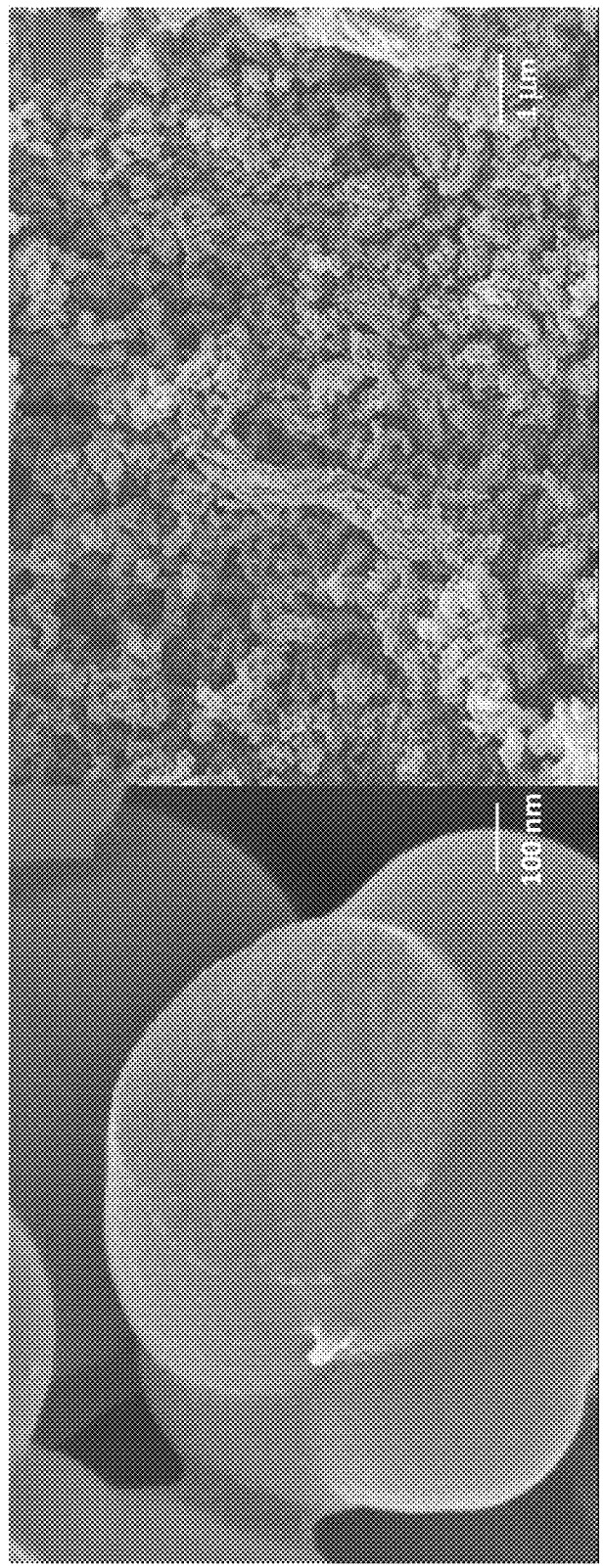
FIG. 12A is an SEM image and FIG. 12C is an TEM image of graphene-encapsulated iron nanoparticles from Fe-sugar prior to exposure to the cracking and welding gas composition Ar/CH$_4$.
FIG. 12B is an SEM image and FIG. 12D is an TEM image of graphene-encapsulated iron nanoparticles from Fe-sugar after exposure to the cracking and welding gas composition Ar/CH$_4$.
Figures 12C, 12D:
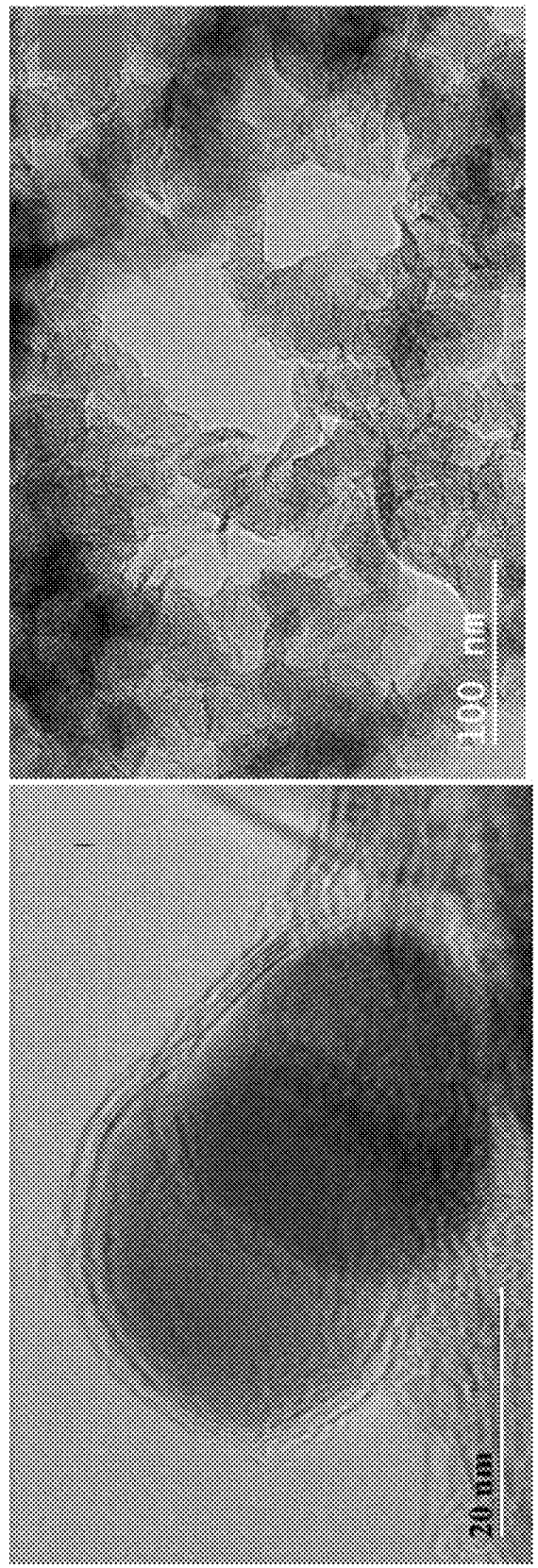
Figure 12E:
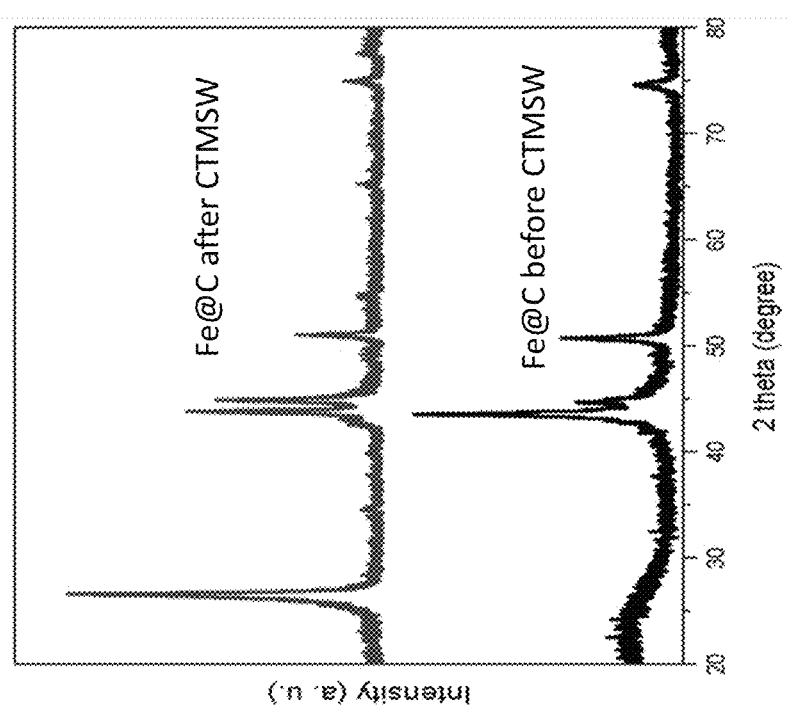
FIG. 12E shows the XRD results for the graphene-encapsulated iron nanoparticles prior to and after exposure to the cracking and welding gas composition Ar/CH$_4$.

FIG. 12A is an SEM image and FIG. 12C is an TEM image of Fe@C from Fe-sugar prior to exposure to the cracking and welding gas composition Ar/$CH_4$. FIG. 12B is an SEM image and FIG. 12D is an TEM image of Fe@C from Fe-sugar after exposure to the cracking and welding gas composition Ar/$CH_4$. FIG. 12E shows the XRD results for the Fe@C prior to and after exposure to the cracking and welding gas composition Ar/$CH_4$. The results show that the Ar/$CH_4$ cracking and welding gas composition provides a graphene-based material comprising flat graphene sheets.

Example B

Examples 1B-5B

Examples 1B-5B follow the procedure of Example 1A, but illustrate the effects of different solvents on precursor preparation. In each case, iron promoted lignin precursor was prepared using an impregnation method. 300 grams of kraft lignin (provided by Domtar) was first added to 300 mL solvent in a 2000 mL glass beaker and stirred for 2 hours to obtain a lignin-solvent mixture. An iron nitrate-water mixture was obtained by adding 246.0 grams of iron (III) nitrate nonahydrate from Sigma-Aldrich to 100 mL DI water in a 500 mL glass beaker and stirring until iron nitrate was dissolved completely. The iron nitrate solution was added drop-like (~2 mL/min) to the lignin-solvent mixture and stirred for 2 hours. The final mixture was kept at room temperature for 24 h and then oven-dried at 110° C. for one day (12-24 hours). Table 2 shows the solvents used. Example 5B corresponds to Example 1A, above.

TABLE 2

Solvent effect on precursor preparation.

| Precursor sample | Solvent |
|---|---|
| Example 1B | DI water |
| Example 2B | Ethanol |
| Example 3B | Acetone |
| Example 4B | 1,3-dioxane |
| Example 5B | Tetrahydrofuran |

Examples 6B-11B

Examples 6B-11B show the effects of different loading of transition metals on precursor preparation. Six loadings of iron (III) nitrate nonahydrate, 20.5 g, 38.9 g, 59.9 g, 105.5 g, 130.4 g and 184.7 g were added to each of six volume levels of DI water 12.5 mL, 25 mL, 37.5 mL, 62.5 mL, 75 mL and 100 mL held in a 500 mL glass beaker, respectively, and all 6 mixtures were stirred for 30 minutes. Each of these six iron nitrate solutions were added drop-like (~2 mL/min) to its respective tetrahydrofuran kraft lignin solution (100 g lignin in 100 mL tetrahydrofuran) and the final mixtures are all stirred for 2 hours. The six samples are labeled as Examples 6B-11B.

Examples 12B-16B

Examples 12B-16B illustrate the effect of different types of transition metals on precursor preparation. In each case, metal promoted lignin precursor is prepared using an impregnation method. 100 grams of kraft lignin (provided by Domtar) was first added to 100 mL tetrahydrofuran in a 2000 mL glass beaker and the lignin-tetrahydrofuran solution is stirred for 2 hours. An amount of a transition metal compound was added to 50 mL DI water in a 500 mL glass beaker, and the mixture was stirred for 30 minutes. The transition metal-containing solution was added drop-like (~2 mL/min) to lignin-tetrahydrofuran solution. The final lignin-tetrahydrofuran-transition metal mixture was stirred for 2 hours, followed by keeping the mixture at room temperature for 24 h, and then oven-drying it at 110° C. for one day. Table 3 shows the transition metal compounds and amounts used. Example 12B corresponds to Example 2A, above. Example 13B corresponds to Example 3A, above. Example 14B corresponds to Example 4A, above. Example 15B corresponds to Example 5A, above. Example 16B corresponds to Example 6A, above.

TABLE 3

Transition metal effect on precursor preparation.

| Precursor sample | Transition metal compound (Amount) |
|---|---|
| Example 12B | $Ni(NO_3)_2 \cdot 6H_2O$ (56.2 g) |
| Example 13B | $Cu(NO_3)_2 \cdot 4H_2O$ (42.7 g) |
| Example 14B | $Co(NO_3)_2 \cdot 6H_2O$ (42.7 g) |
| Example 15B | $(NH_4)_6Mo_7O_{24} \cdot 4H_2O$ (46.4 g) |
| Example 16B | $(NH_4)_6H_2W_{12}O_{40} \cdot xH_2O$ (32.4 g) |

Examples 17B-20B

Examples 17B-20B further illustrate the effect of different types of transition metals on precursor preparation. Specifically, iron (III) nitrate nonahydrate and one or more other transition metal compounds are used in the precursor preparation. In each case, 300 grams of kraft lignin (provided by Domtar) was first added to 300 mL tetrahydrofuran in a 2000 mL glass beaker, and the lignin-tetrahydrofuran mixture was stirred for 2 hours. 246.0 grams of iron (III) nitrate nonahydrate and an amount of one or more other transition metal compounds are added to 100 mL (Example 17B) or 150 mL (Examples 18B-20B) DI water in a 500 mL glass beaker, and the mixture was stirred until all solids dissolve completely. The metal salt solution was added drop-like (~2 mL/min) to lignin-tetrahydrofuran solution. The final mixture was stirred for 2 hours, followed by keeping the mixture at room temperature for 24 h, and then oven-drying it at 110° C. for one day. Table 4 shows the additional transition metal compounds and amounts used.

TABLE 4

Transition metal effect on precursor preparation.

| Precursor sample | Transition metal compound (Amount) |
|---|---|
| Example 17B | $Cu(NO_3)_2 \cdot 4H_2O$ (21.4 g) |
| Example 18B | $Ni(NO_3)_2 \cdot 6H_2O$ (18.7 g) |
| Example 19B | $(NH_4)_6Mo_7O_{24} \cdot 4H_2O$ (23.2 g) |
| Example 20B | $(NH_4)_6Mo_7O_{24} \cdot 4H_2O$ (23.2 g) $Cu(NO_3)_2 \cdot 4H_2O$ (21.4 g) |

Examples 21B-22B

Examples 21B-22B illustrate the effect of different types of transition metal compounds on precursor preparation. 100 grams of kraft lignin (provided by Domtar) was first added to 100 mL tetrahydrofuran in a 2000 mL glass beaker, and the lignin-tetrahydrofuran mixture is stirred for 2 hours. 32.9 grams of iron (III) chloride ($FeCl_3$, from Sigma-Aldrich) (Example 21B) or 40.0 grams of iron (II) chloride tetrahydrate ($FeCl_2 \cdot 4H_2O$) from Sigma-Aldrich) was added to 100 mL DI water in a 500 mL glass beaker and the mixtures were stirred for 30 minutes. The metal salt solution was added drop-like (~2 mL/min) to the lignin-tetrahydrofuran solutions. The final mixtures were stirred for 2 hours, followed by keeping the mixtures at room temperature for 24 h, and then oven-drying it at 110° C. for one day.

Examples 23B-25B

Examples 23B-25B further illustrate the effect of different types of transition metal compounds on precursor preparation. 300 grams of kraft lignin (provided by Domtar) is mixed with 48.3 grams Iron (III) oxide (from Sigma-Aldrich, powder, <5 μm, ≥99%) (Example 23B) or 33.3 grams Iron powder (from Sigma-Aldrich, powder, <10 μm, ≥99.9%) (Example 24B) or 48.3 grams Iron oxides nanoparticles (~25 nm, ≥99.9%) (Example 25B). The mixtures are ground in a ball mill machine (Planetary Ball Mill) with 1000 rpm for 2 hours.

Examples 26B-28B

Examples 26B-28B illustrate the effects of different lignin sources on precursor preparation. Different lignin sources, alkali lignin, organsolv lignin, and lignosulfonates (LS) (all from Sigma-Aldrich) are used to prepare the precursors. The procedure of Example 1A and Example 5B was followed using alkali lignin (Example 26B), organsolv lignin (Example 27B) and LS lignin (Example 28B).

Examples 29B-33B

Examples 29B-33B illustrate preparation of precursors with black liquor.

Example 29B 246.0 grams of Iron (III) nitrate nonahydrate was added to 100 mL DI water in a 500 mL glass beaker, and the mixture was stirred until solid dissolves completely, followed by adding the iron nitrate solution drop-like (~2 mL/min) to black liquor from kraft pulp mills which contains about 300 grams of kraft lignin, and stirring the iron nitrate-black liquor mixture for 1 hours. The final mixture was kept at room temperature for 24 h, and then filtered, followed by washing the solid with DI water 3 times, and then oven-drying the washed solid at 110° C. for one day.

Example 30B 246.0 grams of Iron (III) nitrate nonahydrate and 21.4 grams of copper nitrate tetrahydrate [Cu (NO$_3$)$_2$.4H$_2$O] were added to 100 mL DI water in a 500 mL glass beaker, and the mixture was stirred until all solids dissolve completely, followed by adding the iron and copper nitrate solution drop-like (~2 mL/min) to black liquor from kraft pulp mills which contains about 300 grams of kraft lignin, and stirring the iron-copper nitrate-black liquor mixture for 1 hours. The final mixture was kept at room temperature for 24 h, then filtered, followed by washing the solid with DI water 3 times. The final mixture was kept at room temperature for 24 h and then filtered, followed by washing the solid with DI water 3 times, and then oven-drying the washed solid at 110° C. for one day.

Example 31B 33.3 grams iron powder was added to black liquor from kraft pulp mills which contains about 300 grams of kraft lignin, and the iron powder-black liquor mixture was stirred for 30 minutes. 21.4 grams of copper nitrate tetrahydrate [Cu(NO$_3$)$_2$.4H$_2$O] was added to 50 mL DI water in a 500 mL glass beaker, and the copper nitrate mixture was stirred until the solid dissolved completely. Then the copper nitrate solution was added drop-like (~2 mL/min) to the iron powder-black liquor mixture and the mixture was stirred for 1 hours. The final mixture was kept at room temperature for 24 h, then filtered, followed by washing the solid with DI water 3 times. The final mixture was dried at 110° C. for one day, followed by grinding the dried mixture in a ball mill machine with 1000 rpm for 2 hours.

Example 32B 33.3 grams of iron powder was added to the black liquor from kraft pulp mills, which contains about 300 grams of kraft lignin, and the iron-black liquor mixture was stirred for 1 hours. The final mixture was kept at room temperature for 24 h, then filtered, followed by washing the solid with DI water 3 times. The final mixture was dried at 110° C. for one day, followed by grinding the dried mixture in a ball mill machine with 1000 rpm for 2 hours.

Example 33B 10.7 g of copper nitrate was dissolved in 20 mL DI water, stirred for 30 minutes, then 33.3 grams Iron powder was added to the copper nitrate solution, followed by stirring for 30 minutes. The mixture was kept at room temperature for 24 h, and then transferred to an oven where it is dried at 150° C. for one day. The dried Cu—Fe powder was ground in a ball mill machine for 30 minutes. Next, the Cu—Fe powder was added to a black liquor from kraft pulp mills which contains about 300 grams of kraft lignin, followed by stirring for 1 hours. The final mixture was kept at room temperature for 24 h, then filtered, followed by washing the solid with DI water 3 times. The mixture was dried at 110° C. for one day. The dried mixture was ground in a ball mill machine for 2 hours.

Examples 34B-35B

Examples 34B-35B illustrate preparation of precursors with other biomass feedstocks.

Example 34B

The procedure of Example 34B followed that of Example 7A, above. Specifically, 246.0 grams of Iron (III) nitrate nonahydrate from Sigma-Aldrich was added to 100 mL DI water in a 500 mL glass beaker and the iron nitrate mixture was stirred until the solid dissolves completely. The Iron nitrate solution was added drop-like (~2 mL/min) to 100 g wood char, followed by stirring the mixture for 0.5 hours. Wood char was obtained from a typical fast pyrolysis process. The iron-char mixture was kept at room temperature for 24 h, and then oven-dried at 110° C. for one day.

Example 35B

The procedure of Example 35B followed that of Example 8A, above. Specifically, fifty grams of Iron (III) nitrate nonahydrate from Sigma-Aldrich was dissolved in 1000 mL DI water, followed by adding 100 grams of sugar, which was selected from glucose, xylose, arabinose, galactose, mannose, cellulose, hemicellulose, starch or mixture sugars from biomass hydrolysis process, to the iron (III) nitrate solution. The iron nitrate-sugar mixture was stirred for 0.5 hours and then transferred into a five-liter Parr reactor in which the mixture was heated at the temperature maintained at 160 to 180° C. for 8 hrs. After the reaction, a black product was collected and washed three times with DI water. The final washed product was oven-dried at 110° C. for 12 h.

Examples 36B-40B

Examples 36B-40B illustrate a pretreatment of precursors prior to formation of graphene-based materials. One hundred fifty grams (150 g) of the iron-impregnated kraft lignin sample from each of Examples 1B-5B was thermally treated using a muffle furnace. The inert carrier gas (either argon or nitrogen) was first introduced into the furnace at a flow rate of 80 mL/min for 30 minutes. The furnace was temperature-programmed with a rate of 2.5° C./min to 300° C. and kept at 300° C. for 2 hours. The furnace was turned off and the samples were allowed to cool to ambient temperature naturally. Then the cooled sample was loaded into a ball mill machine and ground at 1000 rpm for 30 minutes. Table 5, below, shows the precursor that was pretreated in each example.

TABLE 5

Precursor Pretreatment.

| Sample | Precursor |
|---|---|
| Example 36B | Example 1B |
| Example 37B | Example 2B |
| Example 38B | Example 3B |
| Example 39B | Example 4B |
| Example 40B | Example 5B |

Fresh dried precursors were examined by thermal gravimetric analysis (TGA) and temperature-programmed decomposition (TPD) (data not shown). The significant mass loss was observed around 190 to 300° C. and was mainly due to $CO_2$ release. The calculation suggests that the pressurization rate at 237° C. in the existing thermal treatment system (2-inch O.D. ceramic tube with a 26-inch length) is 294 psi/min. Scaling up the manufacturing process may cause a pressurization rate increase to 500 psi/min at the temperature zone between 190 to 300° C. This type of pressure increase may breakdown a reactor system. Accordingly, in certain embodiments, the precursors may be pre-decomposed as set forth in these examples for safety operation before loading into the reactor. According to the TGA and TPD results, the desired pre-decomposition temperature is 250 to 300° C.

Examples 41B-95B

Examples 41B-95B illustrate the formation of graphene-based materials from precursors.

Examples 41B-50B

Examples 41B-50B illustrate the effects of solvent types on the yield of graphene-based materials. Fifty grams (50 g) of the iron-impregnated kraft lignin sample from each of Examples 1B-5B, and Examples 36B-40B was packed in the middle of a 2-inch OD ceramic tubular reactor (see FIG. 15). A cracking and welding gas mixture of 50 mL/min argon and 80 mL/min $CH_4$ was first introduced into the reactor for 30 minutes. The reactor was temperature-programmed with a heating rate of 30° C./min to 1000° C. and kept at 1000° C. for 1 hour under the flow of cracking/welding gases. The furnace was cooled down by a rate of 
° C./min to room temperature under a flow of 50 mL/min argon. Thus, this cracking and welding procedure is similar to that used in Example 18A, above. Table 6 shows the yield of graphene-based material from each sample.

TABLE 6

Effects of different solvents on the yield of graphene-based materials.

| Example | Precursor | Solvent | Graphene nanomaterial yield (%) |
|---|---|---|---|
| Example 41B | Example 1B | Water | 52.3 ± 1.0 |
| Example 42B | Example 2B | Ethanol | 53.7 ± 0.8 |
| Example 43B | Example 3B | Acetone | 54.3 ± 0.7 |
| Example 44B | Example 4B | 1,3-Dioxane | 54.5 ± 0.7 |
| Example 45B | Example 5B | Tetrahydrofuran | 55.1 ± 0.5 |
| Example 46B | Example 36B | Water | 72.2 ± 0.5 |
| Example 47B | Example 37B | Ethanol | 73.5 ± 0.6 |
| Example 48B | Example 38B | Acetone | 74.1 ± 0.5 |
| Example 49B | Example 39B | 1,3-Dioxane | 74.5 ± 0.5 |
| Example 50B | Example 40B | Tetrahydrofuran | 75.3 ± 0.4 |

Examples 51B-56B

Examples 51B-56B illustrate the effects of iron loading on the yield of graphene-based materials. Fifty grams (50 g) of the iron-impregnated kraft lignin sample from each of Examples 6B-11B was packed in the middle of a 2-inch OD ceramic tubular reactor. The carrier gas of argon (99.9% purity) was first introduced into the reactor at a flow rate of 50 mL/min for 30 minutes. The reactor was temperature-programmed with a heating rate of 2.5° C./min to 300° C. and kept at 300° C. for 30 minutes. The furnace was then continually heated up by 30° C./min to 1000° C. with the cracking and welding gas of 50 mL/min argon and 80 mL/min and kept at 1000° C. for 1 hour under the cracking and welding flow gases. The furnace is cooled down by 10° C./min to room temperature under a flow of 50 mL/min argon. Thus, this cracking and welding procedure is similar to that used in Example 18A, above. Table 7 shows the yield of graphene-based material from each sample. XRD, SEM, and TEM data was obtained for the resulting graphene-based materials (data not shown). The results show that different morphologies of graphene-based materials may be formed by tuning iron loading, including those comprising graphene chains, fluffy graphene, curved graphene sheets and flat graphene sheets.

TABLE 7

Effects of iron loading on the yield of graphene-based materials.

| Example | Precursor | Iron loading (%) | Graphene nanomaterial yield (%) |
|---|---|---|---|
| Example 51B | Example 6B | 2.5 | 57.0 ± 1.0 |
| Example 52B | Example 7B | 7.5 | 55.7 ± 0.7 |
| Example 53B | Example 8B | 12.5 | 55.3 ± 0.6 |
| Example 54B | Example 9B | 15 | 55.2 ± 0.7 |
| Example 55B | Example 10B | 15 | 55.2 ± 0.6 |
| Example 56B | Example 11B | 20 | 54.7 ± 0.8 |

Examples 57B-65B

Examples 57B-61B illustrate the effects of transition metals on the yield of graphene-based materials while Examples 62B-65B illustrate the effects of the type of transition metal compound. The cracking and welding procedure described in Examples 51B-56B above was used on fifty grams (50 g) of the sample from each of Examples 12B-16B (for Examples 57B-61B) and Examples 17B-20B (for Examples 62B-65B). Table 8 shows the results.

TABLE 8

Effects of type of transition metals and type of transition metal compound on the yield of graphene-based materials.

| Example | Precursor | Metals | Graphene nanomaterial yield (%) |
|---|---|---|---|
| Example 57B | Example 12B | Ni | 45.2 ± 0.7 |
| Example 58B | Example 13B | Cu | 52.1 ± 0.6 |
| Example 59B | Example 14B | Co | 55.3 ± 0.9 |
| Example 60B | Example 15B | Mo | 59.7 ± 1.0 |
| Example 61B | Example 16B | W | 60.2 ± 0.7 |
| Example 62B | Example 21B | $FeCl_3$ | 52.3 ± 1.0 |
| Example 63B | Example 22B | $FeCl_2$ | 51.5 ± 1.2 |
| Example 64B | Example 23B | Iron oxide powder | 50.1 ± 0.7 |
| Example 65B | Example 24B | Iron powder | 49.3 ± 0.8 |

Examples 66B-69B

Examples 66B-69B illustrate the effects of different cracking and welding gases on the yield of graphene-based materials. Specifically, the effects of different cracking and welding gases, including hydrogen ($H_2$), methane ($CH_4$), carbon dioxide ($CO_2$), and natural gas (NG), on production yield of graphene materials from lignin are evaluated. Fifty grams (50 g) of the Example 40B sample was packed in the middle of a 2-inch OD ceramic tubular reactor in each run. The cracking and welding gas was introduced into the reactor. The reactor was temperature-programmed with a heating rate of 30° C./min to 1000° C. and kept at 1000° C. for 1 hour. The furnace was cooled down by 10° C./min to room temperature. Table 9 shows the results.

TABLE 9

Effects of type of cracking and welding gases on the yield of graphene-based materials.

| Example | Precursor | Cracking and welding gases | | Graphene nanomaterial yield (%) |
|---|---|---|---|---|
| | | Ar (mL/min) | Other gas (mL/min) | |
| Example 50B (from Table 6) | Example 40B | 50 | $CH_4$ (80) | 75.3 ± 0.4 |
| Example 66B | Example 40B | 50 | $H_2$ (80) | 60.1 ± 0.5 |
| Example 67B | Example 40B | 50 | — (0) | 62.3 ± 0.5 |
| Example 68B | Example 40B | 50 | NG (80) | 77.1 ± 0.8 |
| Example 69B | Example 40B | 50 | $CO_2$ (80) | 56.2 ± 0.5 |

Examples 68B and 70B-73B

Examples 68B and 70B-73B illustrate the effects of temperature ramp rate on the yield of graphene-based materials. Heating rate is an important factor in determining biomass thermal product yields. Effects of different temperature ramp rates, including 2.5, 5, 10, 20 and 30° C./min on the yield of graphene-based material are evaluated. One hundred fifty grams (150 g) of the Example 40B sample was packed in the middle of a 2-inch OD ceramic tubular reactor in each run. The cracking and welding gases are introduced into the reactor at a flow rate of 80 mL/min (NG) and 50 mL/min (Ar). The reactor was temperature-programmed with five different heating rates of 2.5, or 5, or 10, or 20, or 30° C./min to 1000° C., respectively, and all kept at 1000° C. for 1 hour. The furnace was cooled down by 10° C./min to room temperature. The results are shown in Table 10.

TABLE 10

Effects of type of temperature ramp rate on the yield of graphene-based materials.

| Example | Precursor | Temperature ramp rate (° C./min) | Cracking and welding gas flow rate (mL/min) | | Graphene nanomaterial yield (%) |
|---|---|---|---|---|---|
| | | | Ar | NG | |
| Example 70B | Example 40B | 2.5 | 50 | 80 | 74.2 ± 0.7 |
| Example 71B | Example 40B | 5 | 50 | 80 | 75.0 ± 0.8 |
| Example 68B (Table 9) | Example 40B | 10 | 50 | 80 | 77.1 ± 0.8 |
| Example 72B | Example 40B | 20 | 50 | 80 | 78.3 ± 0.5 |
| Example 73B | Example 40B | 30 | 50 | 80 | 76.6 ± 0.7 |

The results show that higher temperature ramp rate promotes the formation of the graphene structure. Without wishing to be bound to any theory, it is believed that during lignin catalytic thermal carbonization process, C—O, C═O, C—C and C—H bonds are first catalytically broken down and volatiles ($CO_2$, CO, $H_2O$, $H_2$, and $CH_4$) are released. Some active carbon species like carbene form, and then bond each other to form C═C structure around catalyst particles. If the temperature ramp rate is lower, catalyst particles are trapped inside a tightly condensed carbon shell. This prevents the further catalytic function of the catalyst. Catalyst particles won't be sealed by carbon shell if the temperature ramp rate is fast enough. Therefore, catalytic function can be retained further during the reaction.

Examples 67B-68B and 74B-77B

Examples 67B-68B and 74B-77B illustrate the effects of cracking and welding gas flow rate on graphene nanomaterial production.

Three cracking and welding gas flow rates, 80, 150, and 300 mL/min were evaluated. Fifty grams (50 g) of the Example 40B sample was packed in the middle of a 2-inch OD ceramic tubular reactor in each run. The cracking and welding gas (either argon or NG) was introduced into the reactor. The reactor was temperature-programmed with a heating rate of 10° C./min to 1000° C. and kept at 1000° C. for 1 hour. The furnace was cooled down by 10° C./min to room temperature. The results are shown in Table 11.

TABLE 11

Effects of cracking and welding gas flow rate on yield of graphene-based materials.

| Example | Precursor | Cracking and welding gas Flow rate (mL/min) | | Yield to graphene nanomaterials (%) |
|---|---|---|---|---|
| | | Ar | NG | |
| Example 67B (Table 9) | Example 40B | 50 | 0 | 62.3 ± 0.5 |
| Example 74B | Example 40B | 150 | 0 | 59.7 ± 0.7 |
| Example 75B | Example 40B | 300 | 0 | 55.6 ± 0.5 |
| Example 68B (Table 9) | Example 40B | 50 | 80 | 77.1 ± 0.8 |
| Example 76B | Example 40B | 50 | 150 | 78.5 ± 0.7 |
| Example 77B | Example 40B | 50 | 300 | 77.6 ± 1.0 |

Examples 68B and 78B-81B

Examples 68B and 78B-81B illustrate the effects of thermal treatment time on the yield of graphene-based materials. Specifically, the effects of different thermal treatment times, including 0, 0.5, 1, 3, and 5 hours, on yield were evaluated. Fifty grams (50 g) of the Example 40B sample was packed in the middle of a 2-inch OD ceramic tubular reactor in each run. The cracking and welding gas was introduced into the reactor. The reactor was temperature-programmed with a heating rate of 10° C./min to 1000° C. and kept at 1000° C. for 0, 0.5, 1, 3, or 5 hours. The furnace was cooled down by 10° C./min to room temperature. Table 12 shows the results. XRD, SEM, and TEM data was obtained for the resulting graphene-based materials (data not shown). The results show that different morphologies of graphene-based materials may be formed by tuning thermal treatment time, including those comprising graphene chains, fluffy graphene, curved graphene sheets and flat graphene sheets.

TABLE 12

Effects of thermal treatment time on yield of graphene-based materials.

| Example | Precursor | Cracking and welding gas Flow rate (mL/min) | | Thermal treatment time (hr) | Graphene nanomaterial yield (%) |
| --- | --- | --- | --- | --- | --- |
| | | Ar | NG | | |
| Example 78B | Example 40B | 50 | 80 | 0 | 74.2 ± 0.3 |
| Example 79B | Example 40B | 50 | 80 | 0.5 | 75.8 ± 0.5 |
| Example 68B (Table 9) | Example 40B | 50 | 80 | 1 | 77.1 ± 0.8 |
| Example 80B | Example 40B | 50 | 80 | 3 | 80.6 ± 0.9 |
| Example 81B | Example 40B | 50 | 80 | 5 | 85.2 ± 1.1 |

Examples 50B and 82B-87B

Examples 50B and 82B-87B illustrate the effects of thermal heating temperature on the yield of graphene-based materials. Specifically, the effects of different heating temperatures, including 500, 600, 750, 850, 900, 950 and 1000° C. on the yield was evaluated. Fifty grams (50 g) of the Example 40B sample was packed in the middle of a 2-inch OD ceramic tubular reactor in each run. The cracking and welding gas was introduced into the reactor. The reactor was temperature-programmed with a heating rate of 10° C./min to the desired heating temperature and kept at that temperature for 1 hours. The furnace was cooled down by 10° C./min to room temperature. The results are shown in Table 13.

TABLE 13

Effects of heating temperature on the yield of graphene-based materials.

| Example | Precursor | Cracking and welding gas Flow rate (mL/min) | | Thermal heating temperature (° C.) | Graphene nanomaterial yield (%) |
| --- | --- | --- | --- | --- | --- |
| | | Ar | CH₄ | | |
| Example 82B | Example 40B | 50 | 80 | 500 | 86.5 ± 0.5 |
| Example 83B | Example 40B | 50 | 80 | 600 | 81.6 ± 0.5 |

TABLE 13-continued

Effects of heating temperature on the yield of graphene-based materials.

| Example | Precursor | Cracking and welding gas Flow rate (mL/min) | | Thermal heating temperature (° C.) | Graphene nanomaterial yield (%) |
| --- | --- | --- | --- | --- | --- |
| | | Ar | CH₄ | | |
| Example 84B | Example 40B | 50 | 80 | 750 | 75.7 ± 0.3 |
| Example 85B | Example 40B | 50 | 80 | 850 | 70.7 ± 0.4 |
| Example 86B | Example 40B | 50 | 80 | 900 | 65.1 ± 0.3 |
| Example 87B | Example 40B | 50 | 80 | 950 | 67.6 ± 0.5 |
| Example 50B (Table 6) | Example 40B | 50 | 80 | 1000 | 75.3 ± 0.4 |

Examples 88B-92B

Figure 13:
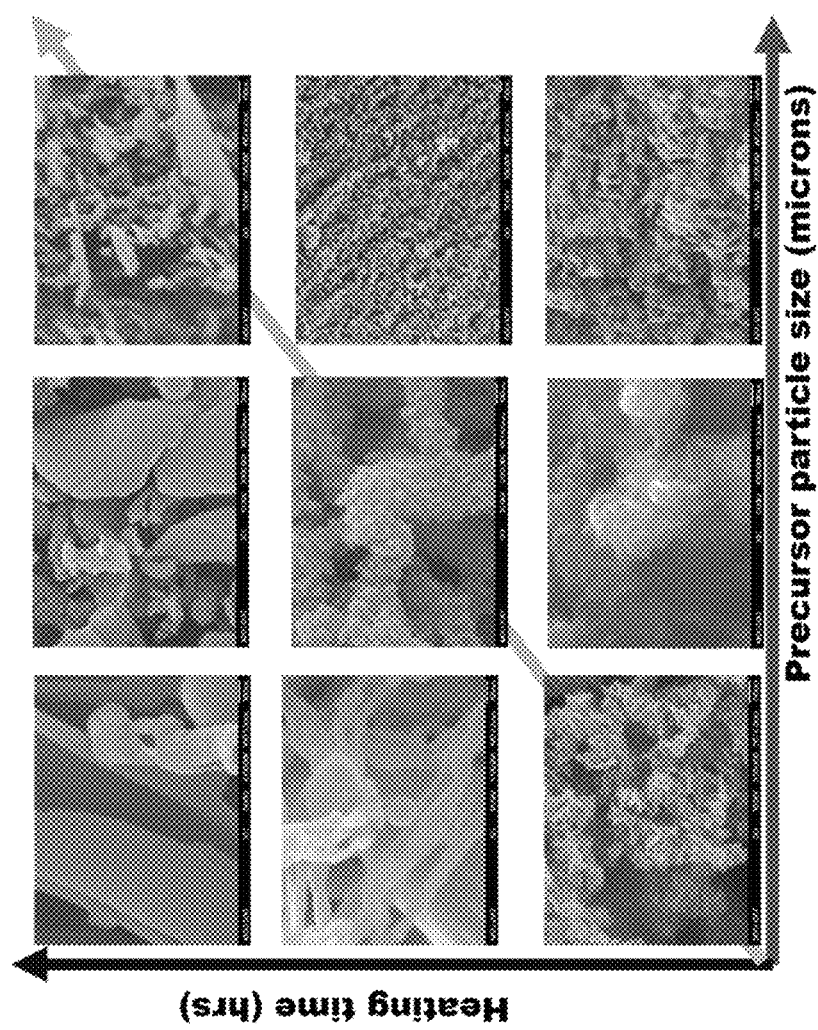
FIG. 13 show SEM images illustrating the effect on the particle size of carbon-metal precursor and heating time during the cracking/welding process on the morphology of graphene in the graphene-based materials.

Examples 88B-92B illustrate the effects of precursor particle size on yield of graphene-based materials. Sample from the Example 40B was separated to different sizes: ≤44, 44-125, 125-177, 177-250, 250-420 μm. Fifty grams (50 g) of each of five size samples was packed in the middle of a 2-inch OD ceramic tubular reactor in each run. The cracking and welding gas was introduced into the reactor. The reactor was temperature-programmed with a heating rate of 10° C./min to 1000° C. and kept at 1000° C. for 1 hour. The furnace was cooled down by 10° C./min to room temperature. Table 14 shows the results. XRD, SEM, and TEM data was obtained for the resulting graphene-based materials. The SEM data is shown in FIG. 13, along with SEM data showing the affects of heating time. The results show that different morphologies of graphene-based materials may be formed by tuning precursor particle size and heating time, including those comprising graphene chains, fluffy graphene, curved graphene sheets and flat graphene sheets. In general, longer heating times and smaller precursor particle size can produce larger sized graphene sheets.

TABLE 14

Effects of the precursor particle size on the yield of graphene-based materials.

| Example | Precursor | Cracking and welding gas flow rate (mL/min) | | Precursor particle size (μm) | Graphene nanomaterial yield (%) |
| --- | --- | --- | --- | --- | --- |
| | | Ar | CH₄ | | |
| Example 88B | Example 40B | 50 | 80 | ≤44 | 78.1 ± 0.5 |
| Example 89B | Example 40B | 50 | 80 | 44-125 | 76.3 ± 0.3 |
| Example 90B | Example 40B | 50 | 80 | 125-177 | 75.7 ± 0.5 |
| Example 91B | Example 40B | 50 | 80 | 177-250 | 75.1 ± 0.7 |
| Example 92B | Example 40B | 50 | 80 | 250-420 | 74.6 ± 0.5 |

Examples 45B and 93B-95B

Examples 45B and 93B-95B illustrate the effects of different lignin sources on the yield of graphene-based materials. Fifty grams (50 g) of the iron-impregnated lignin sample from each of Examples 21B-23B was packed in the middle of a 2-inch OD ceramic tubular reactor. The carrier gas, argon (99.9% purity), was first introduced into the reactor at a flow rate of 50 mL/min for 30 minutes. The reactor was temperature-programmed with a heating rate of 2.5° C./min to 300° C. and kept at 300° C. for 30 minutes. The furnace was then continually heated up by 30° C./min to 1000° C. with the cracking and welding gas mixture of 50 mL/min argon and 80 mL/min $CH_4$ and kept at 1000° C. for 1 hour under the cracking and welding flow gases. The furnace was cooled down by 10° C./min to room temperature under a flow of 50 mL/min argon. Thus, this cracking and welding procedure is similar to that used in Example 18A, above. The results are shown in Table 15.

TABLE 15

Effects of lignin resources on the yield of graphene-based materials.

| Example | Precursor | Graphene nanomaterial yield (%) |
|---|---|---|
| Example 45B (Table 6) | Example 5B | 55.1 ± 0.5 |
| Example 93B | Example 21B | 55.5 ± 0.4 |
| Example 94B | Example 22B | 52.7 ± 0.9 |
| Example 95B | Example 23B | 53.5 ± 0.7 |

Post Treatment and Purification of the Graphene-Based Material

A green post treatment process was developed by using steam (water vapor), $CO_2$, air, or 5% (V) $O_2$ in $N_2$ instead of toxic acids or other chemicals. Such a process will also decrease the overall cost of the process and simplify the purification process. Different post treatment gases—steam (water vapor), $CO_2$, air, or 5% (V) $O_2$ in $N_2$ were compared using graphene-based material from Examples 66B and 67B. Fifty grams (50 g) of Example 66B or 67B sample was packed in the middle of a 2-inch OD ceramic tubular reactor in each run. The post treatment gas was introduced into the reactor at a flow rate of 80 mL/min. The reactor was temperature-programmed with a rate of 2.5° C./min and heated to 700, 300 or 500° C. and kept at that temperature for 1 hour. The furnace was cooled down by 10° C./min to room temperature. The experiments are summarized in Table 16.

TABLE 16

Post treatment of graphene-based materials.

| Example | Sample | Post treatment gas | Flow rate (mL/min) | Temperature (° C.) |
|---|---|---|---|---|
| Example 96B | Example 66B | $CO_2$ | 80 | 700 |
| Example 97B | Example 66B | $H_2O$ (vapor) | 80 | 700 |
| Example 98B | Example 66B | Air | 80 | 300 |
| Example 99B | Example 66B | 5% $O_2$ in $N_2$ | 80 | 500 |
| Example 100B | Example 67B | $CO_2$ | 80 | 700 |
| Example 101B | Example 67B | $H_2O$ (vapor) | 80 | 700 |
| Example 102B | Example 67B | Air | 80 | 300 |
| Example 103B | Example 67B | 5% $O_2$ in $N_2$ | 80 | 500 |

Graphene-Based Materials Structure Analysis

The characterization of graphene-based materials characterization makes use of electron microscopy techniques, e.g., SEM and TEM, Raman spectroscopy, and XRD. The SEM technique can be used to assess the overall morphology of the graphene-based materials. The HRTEM technique can be used to get more detailed structural information via fringes structure. The XRD technique can be used to evaluate the average structural parameters (such as lateral size and thickness), and can also be used to estimate the relative content of graphitic materials. Each of these techniques were used to characterize the graphene-based materials formed in Examples A and B. In addition, the crystallite thickness (Lc) was calculated from the (002) band at half maximum intensity by applying the Scherrer equation:

$$L_c = \frac{K\lambda}{B\cos\theta}$$

where $\lambda$ is the wavelength of incident X-rays, K is 0.89, B and $\theta$ correspond to the full width at half maximum (FWHM) and the Bragg angle of the peak, respectively. The Raman technique may be used to evaluate defects in graphene-based materials. The crystal diameter (i.e., lateral size, La) of graphene-based materials also can be calculated by D and G bands as shown in the equation below:

$$La(\text{nm}) = (2.4 \times 10^{-10})\lambda^4\left(\frac{I_G}{I_D}\right)$$

where $\lambda$ is the wavelength of the laser, $I_G$ and $I_D$ are the intensity of G and D bands, respectively.

The graphene-based materials from Example 68B, Examples 78B to 81B, and Examples 88B to 92B) were further characterized by XRD, Raman, SEM, and TEM. For comparison, two commercial materials (Example C1 and C2) were also characterized. The structure parameters of graphene materials are list in Table 17.

TABLE 17

Structure parameters of graphene-based materials.

| | Technique | | | |
|---|---|---|---|---|
| Example | XRD Lc (nm) | Raman La (nm) | SEM Particle size (um) | TEM Layers |
| Example 68B | 6 | 19 | 0.5-10 | 9 |
| Example 78B | 4 | 13 | 0.5-5 | 6 |
| Example 79B | 5 | 16 | 0.5-10 | 7 |
| Example 80B | 9 | 28 | 0.5-10 | 12 |
| Example 81B | 13 | 35 | 0.5-10 | 16 |
| Example 88B | 12 | 37 | 0.5-20 | 30 |
| Example 89B | 6 | 19 | 0.5-10 | 25 |
| Example 90B | 7 | 22 | 0.5-10 | 20 |
| Example 91B | 6 | 19 | 0.5-10 | 13 |
| Example 92B | 6 | 18 | 0.5-10 | 10 |
| Example C1* | 21 | 164 | 1-30 | 27 |
| Example C2* | 0.7 | 19 | 1-20 | 5 |

*Example C1 and C2 are commercial graphene materials which made from CVD and thermal chemical exfoliation process, respectively.

XRD (X-ray diffraction), Raman spectroscopy, scanning electron microscopy (SEM), and high-resolution transmission electron microscopy (HRTEM) characterization results demonstrate that the graphene materials produced by an embodiment of the present methods have better or similar quality as compared to currently marketed graphene products.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of synthesizing a graphene-based material, the method comprising exposing graphene-encapsulated metal nanoparticles, each nanoparticle comprising a graphene shell surrounding a metal core, to a cracking and welding gas composition under conditions sufficient to crack graphene shells and to reconstruct cracked graphene shells to form the graphene-based material.

2. The method of claim 1, wherein the cracking and welding gas composition is selected to maximize the yield of the graphene-based material.

3. The method of claim 2, wherein the yield is at least 90%.

4. The method of claim 1, wherein the cracking and welding gas composition comprises one or more of methane, ethane, propane, natural gas.

5. The method of claim 4, wherein the cracking and welding gas composition further comprises argon.

6. The method of claim 1, wherein the exposure is carried out at a temperature of at least 1000° C. for at least 30 minutes.

7. The method of claim 1, wherein prior to exposing the graphene-encapsulated metal nanoparticles to the cracking and welding gas composition, the graphene-encapsulated metal nanoparticles are exposed to argon at an elevated temperature for a period of time.

8. The method of claim 1, wherein the graphene-based material comprises flat or curved graphene sheets.

9. The method of claim 1, wherein the cracking and welding gas composition comprises one or more of methane, ethane, propane and natural gas, the graphene-based material comprises flat or curved graphene sheets, and the yield of the graphene-based material is at least 90%.

10. The method of claim 1, further comprising exposing a carbon-metal based precursor to an inert gas composition at an elevated temperature for a period of time sufficient to convert the carbon to graphene, thereby forming the graphene-encapsulated metal nanoparticles.

11. The method of claim 10, wherein the elevated temperature is in the range of from 700° C. to 1000° C.

12. The method of claim 10, wherein the carbon of the carbon-metal based precursor is provided by a biomass feedstock.

13. The method of claim 12, wherein the biomass feedstock comprises kraft lignin.

14. The method of claim 10, further comprising forming the carbon-metal based precursor by mixing a first solution comprising a first solvent and a carbon source with a second solution comprising a second solvent and a metal source to form a carbon-metal mixture.

15. The method of claim 14, wherein the carbon source comprises kraft lignin and the first solvent is tetrahydrofuran.

16. The method of claim 14, wherein the metal salt is a metal nitrate.

17. The method of claim 14, wherein the metal is iron and the metal source is present in the carbon-metal mixture at an amount in the range of from 5 to 15% by weight.

18. The method of claim 14, further comprising exposing the carbon-metal mixture to another inert gas composition at another elevated temperature for another period of time sufficient to at least partially decompose the carbon source, followed by ground-milling.

19. A method of synthesizing a graphene-based material, the method comprising:
    mixing a first solution comprising a first solvent and a carbon source with a second solution comprising a second solvent and a metal source to form a carbon-metal mixture;
    exposing the carbon-metal mixture to an inert gas composition at an elevated temperature and for a period of time sufficient to at least partially decompose the carbon source, followed by ground-milling, thereby forming a carbon-metal precursor;
    exposing the carbon-metal based precursor to another inert gas composition at another elevated temperature for another period of time sufficient to convert the carbon to graphene, thereby forming graphene-encapsulated metal nanoparticles, each nanoparticle comprising a graphene shell surrounding a metal core; and
    exposing the graphene-encapsulated metal nanoparticles to a cracking and welding gas composition under conditions sufficient to crack graphene shells and to reconstruct cracked graphene shells to form the graphene-based material.

20. The method of claim 19, wherein the carbon source comprises kraft lignin.

* * * * *